United States Patent
Gorshe et al.

(10) Patent No.: US 6,768,745 B1
(45) Date of Patent: Jul. 27, 2004

(54) FLEXIBLE SONET ACCESS AND TRANSMISSION SYSTEM

(75) Inventors: Steven Scott Gorshe, Beaverton, OR (US); Robert Wesley Brooks, Aloha, OR (US)

(73) Assignee: Zhone Technologies, Inc., Oakland, CA (US)

( * ) Notice: Subject to any disclaimer, the term of this patent is extended or adjusted under 35 U.S.C. 154(b) by 0 days.

(21) Appl. No.: 09/282,407

(22) Filed: Mar. 31, 1999

Related U.S. Application Data

(60) Provisional application No. 60/083,498, filed on Apr. 29, 1998.

(51) Int. Cl.[7] ................... H04L 12/28; H04L 12/403; H04L 12/50; H04B 10/20
(52) U.S. Cl. ................... 370/421; 370/451; 370/376; 370/907; 398/58; 398/59
(58) Field of Search ................ 370/907, 375, 370/376, 539, 357–360, 362–364, 377–381, 384, 538, 541, 463, 401–403, 395, 438, 451, 502, 421, 378, 366, 432, 433, 434, 535, 422, 423; 398/58, 59, 60, 73

(56) References Cited

U.S. PATENT DOCUMENTS

| | | | | |
|---|---|---|---|---|
| 5,161,152 A | * | 11/1992 | Czerwiec et al. | 370/538 |
| 5,282,195 A | * | 1/1994 | Hood et al. | 370/378 |
| 5,355,362 A | * | 10/1994 | Gorshe et al. | 370/222 |
| 5,412,651 A | * | 5/1995 | Gorshe | 370/412 |
| 5,497,363 A | * | 3/1996 | Gingell | 370/376 |
| 5,715,248 A | * | 2/1998 | Lagle, III et al. | 370/366 |
| 5,729,546 A | * | 3/1998 | Gupta et al. | 370/434 |
| 5,737,334 A | * | 4/1998 | Prince et al. | 370/395 |
| 5,757,806 A | * | 5/1998 | Koyama et al. | 370/535 |
| 5,838,680 A | * | 11/1998 | Noiri et al. | 370/395 |
| 5,848,065 A | * | 12/1998 | Gorshe et al. | 370/376 |
| 5,867,484 A | * | 2/1999 | Shaunfield | 370/254 |
| 5,878,028 A | * | 3/1999 | Roy et al. | 370/463 |
| 5,878,039 A | * | 3/1999 | Gorshe et al. | 370/376 |
| 5,918,027 A | * | 6/1999 | Osakabe | 395/709 |
| 6,065,087 A | * | 5/2000 | Keaveny et al. | 370/402 |
| 6,363,078 B1 | * | 3/2002 | Garcia et al. | 370/438 |

* cited by examiner

Primary Examiner—Hanh Nguyen
(74) Attorney, Agent, or Firm—Gray Cary Ware & Freidenrich LLP

(57) ABSTRACT

A SONET network interface for interconnecting at least one high speed unit (HSU) with at least two low speed interface units (LSUs) to enable transmission of signals therebetween. The interface having: a common bus of predetermined bit width for interfacing the HSU unit with each of the LSU units to enable transmission of signals from each of the LSUs to the HSU, and reception of the signals from the HSU to each of the LSUs; a first partition bus of the predetermined bit width for interfacing the HSU to a predetermined number of the LSUs, the first partition bus being partitioned into a first bus for interfacing the HSU to a first subset of the LSUs and a second bus for interfacing the HSU to a second subset of the LSUs; and a second partition bus of the predetermined bit width for interfacing the HSU to a predetermined number of the LSU units.

46 Claims, 12 Drawing Sheets

PR - INTRA-SHELF RECEIVE PCM BUSES
PX - INTRA-SHELF TRANSMIT PCM BUSES
PTAB - PASS-THROUGH FROM HSU A TO HSU B
PTBA - PASS-THROUGH FROM HSU B TO HSU A

IAI - IRI ADD INPUT
IAO - IRI ADD OUTPUT
IDI - IRI DORP INPUT
IDO - IRI DROP OUTPUT
CTL - CONTROL TO PREVENT 2 DRIVERS ON THE SAME BUS

FLEXIBLE SONET ACCESS AND TRANSMISSION SYSTEM

CROSS-REFERENCE TO RELATED APPLICATION

This application is a conversion of provisional application Ser. No. 60/083,498 filed Apr. 29, 1998.

BACKGROUND OF THE INVENTION

1. Field of the Invention

The present invention relates to an apparatus for flexible SONET access and transmission; and, in particular, to an apparatus for flexible SONET access and transmission which flexibly and economically supports services from voice frequency (POTS) to OC 48 (2488 Mbit/s) with the potential for value added services, mixed ATM and STM multiplexing; and capable of modular system growth.

2. Description of the Related Art

Optical fibers provide a high bandwidth medium for data transmission. Consequently, optical fibers have found applications in many computer networks, including those used in digital telephone systems. To allow a uniform interface for voice and computer equipment on an integrated voice and computer network using optical fibers, American National Standards, Inc. adopted a standard, known as SONET (Synchronous Optical Network). The SONET standard is described in "American National Standard for Telecommunications-Digital Hierarchy-Optical Interface Rates and Formats Specification (SONET)" ("SONET document"), which is hereby incorporated by reference in its entirety. The SONET document defines a hierarchy of data formats to support a layered communication architecture, which comprises the photonic, section, line and path layers. A schematic model of the layered architecture is provided in FIG. 12. Each of these layers, except the photonic layer, builds on services provided by the next lower layer.

The basic data unit of the SONET standard is represented by a frame, called the STS-1 frame, consisting of 90 "columns" and 9 'rows' of 8-bit bytes. The STS-1 frame is shown graphically in FIG. 13. Under the fixed transmission rate, the STS-1 frame is transmitted in 125 microseconds. Under the SONET standard, as shown in FIG. 13, data of an STS-1 frame is transmitted row by row, and from left to right. In each byte, the most significant bit is transmitted first.

To support the layered architecture, the first three columns of the STS-1 frame are used for carrying transport overhead information, and the remaining 87 columns of the frame, known as the STS-1 Synchronous Payload Envelope (SPE), carry the data to be transported. Path layer overhead are also carried in the STS-1. FIG. 14 shows the allocation of the transport and path overheads in the STS-1 frame. A description of each of the overhead bytes is provided in the SONET document and is therefore omitted from this discussion.

The SONET standard also defines (i) data formats which are each smaller than an STS-1 frame and transported within the STS-1 SPE, called virtual tributaries (VT); and (ii) data formats, designated as STS-N frames (where N is an integer), which are each larger than a STS-1 frame. An STS-N frame is formed by byte inter-leaving N STS-1 frames. The counterparts of the STS-1 and STS-N data formats in the optical fibers are called OC-1 and OC-N (optical carrier level 1 and optical carrier level N) respectively. OC-1 and OC-N are obtained by optical conversions of the respective STS signals after scrambling.

A rough description for each of the layers in the SONET architecture is provided here to facilitate understanding of the present invention. The photonic layer provides transport of bits at a fixed bit rate (N×51.84 megabits/second, where N is an integer) across the physical medium, i.e. the optical fibers. The main function of the photonic layer is the conversion between the STS signals and the OC signals.

The section layer deals with the transport of an STS-N frame across the physical medium. In this layer, framing, scrambling, section error monitoring are provided. Equipment which terminates in the section layer reads, interprets and modifies the section overhead bytes of the STS-1 frame.

The line layer deals with the reliable transport of the path layer payload. A path is a basic unit of logical point-to-point connection between equipment providing a service on the network. More than one path layer payload, each typically having a data rate less than the STS-1 basic data rate, can share an STS-SPE. The line layer synchronizes and multiplexes for the path layer. The overhead bytes for the line layer includes overhead involved in maintenance and protection (i.e. error recovery and redundancy) purposes. Equipment which terminates in the line layer reads, interprets and modifies the line layer overhead bytes of the STS-1 frame.

The path layer deals with the transport of services between path terminating equipment. Examples of such services include synchronous and asynchronous DS-1 services and video signals. The main function of the path layer is to map the services into the format required by the line layer.

Previous generation SONET equipment had one or more of the following limitations. The locations in which different types of tributary interface units (e.g., DS1, DS3, or optical interface units) was typically restricted. This lead to inefficiencies in using all of the unit slots in a shelf for different service mixes. Those few systems that allowed a more universal slot usage did not allow for small incremental growth of the lower-rate tributary interfaces. For example, placing 14 DS1s on a working unit and using an identical unit for 1:1 protection. Previous equipment lacked a modular manner in which to increase the capacity of a single shelf system without duplicating all of the common units in the additional shelf. In most cases, the additional shelf had to be a separate network element within the SONET network. Previous generation equipment also typically required many different types of common units to perform such functions as system control, external maintenance LAN network interface, high-speed optical interface, system timing generation, time slot interchange (TSI), and intermediate SONET signal processing. Previous systems used dedicated buses for synchronous transfer mode (STM) and asynchronous transfer mode (ATM) PCM signals with no sharing of the two formats within the same STS-N high-speed multiplexed signal. Typically, ATM and STM signals have been processed in separate, unique shelves. Previous systems did not allow for units to use the tributary interface slots to provide a common processing function across part or all of the system's PCM data without using add/drop time slots on the PCM buses. Also, previous generation equipment had no provision for a local area network among the tributary interface units that allows for packet processing (e.g., IP store and forward) of data packets within the tributary PCM data. Lastly, typical systems of the prior art terminated dropped paths from both directions of a ring configuration on a single unit and also on its protection partner unit, thus requiring twice as much termination circuitry as necessary.

What is needed is an architecture which allows a more universal SONET access and transmission system that can economically serve both small and large bandwidth applications with an extremely wide range of services and which has the potential for value-added services wherein all high-speed interface and TSI functions are combined onto the same unit (in conjunction with the system backplane).

SUMMARY OF THE INVENTION

The present invention provides hardware architecture for a flexible transmission and access platform. The primary high speed interfaces can be SONET STS-1 (52 Mb/s), OC-3 (155 Mb/s), OC-12 (622 Mb/s), or OC-48 (2488 Mb/s). For OC-3, OC-12, and OC-48, line terminal, linear add/drop multiplex, and unidirectional path switched ring network topologies are supported. On the tributary input side, services between voice frequency plain-old telephone service (POTS) and OC-3 can be supported.

The time slot interchange function is performed on the backplane so that the system can simultaneously and economically support STM time slot interchange (TSI) of channels from 16 kb/s through 51 Mb/s as well as ATM cell multiplexing. Systems using an integrated circuit for all TSI and cell multiplex functions typically require a different, costly device for narrowband services (16–384 kb/s), wideband services (1.5–50 Mb/s), and ATM cells.

A single, small shelf is the building block for the SONET access and transmission system of the present invention. The "primary" shelf can support up to 84 DS1 interfaces, up to 168 POTS interfaces, or a mix of narrowband and wideband services. When the tributary interface units in the system use the entire bandwidth of the primary high speed interface, a second shelf can be subtended from the primary shelf in one of two ways. First, a single shelf can be subtended as an "expansion" shelf in which there is minimal replication of common units. The expansion interface units in the expansion shelf are the only common units and have the minimum intelligence necessary to provide a buffered interface for PCM signals between the tributary units in the expansion shelf and the high speed interface unit in the primary shelf. The second method for subtending an additional shelf is through a ring/bus connection that allows an economical chaining of multiple shelves together in the same location. In this application, the only units unique to the subtended shelves are the intershelf ring interface units, which provide the PCM data transfer between the shelf backplane and the intershelf bus and limited shelf control.

Within the shelves, PCM buses are preferably partitioned into 4-bit wide parallel buses with a "byte status" signal per bus. This choice of bus width is highly efficient. Three sets of transmit and receive PCM buses connect to each tributary interface card slot. In normal operation, each bus carries an STS-1 bandwidth. One transmit/receive bus pair is accessible by all tributary slots. The other two transmit/receive bus pairs are partitioned such that two different physical sets of buses service two groups of tributary units.

This segmenting allows either having all tributary units share the same logical bus, or to use the one group of tributary unit slots for other higher-speed applications or common data processing functions.

Multiple data communications buses exist in the backplane to provide common control communications for the shelf, SONET data communication channels, and a LAN for value-added processing of the user data.

The tributary unit connectors and signal assignments allow cost-sensitive narrowband units to use a low-cost connector and bus interface that is a subset of the backplane connector.

Accordingly, A SONET network interface for interconnecting at least one high speed unit (HSU) with at least two low speed interface units (LSUs) to enable transmission of signals therebetween is provided. The interface comprises: a common bus of predetermined bit width for interfacing the at least one HSU unit with each of the at least two LSU units to enable transmission of signals from each of the at least two LSUs to the at least one HSU, and reception of the signals from the at least one HSU to each of the at least two LSUs; a first partition bus of the predetermined bit width for interfacing the at least one HSU to a predetermined number of the at least two LSUs, the first partition bus being partitioned into a first bus for interfacing the at least one HSU to a first subset of the at least two LSUs and a second bus for interfacing the at least one HSU to a second subset of the at least two LSUs; and a second partition bus of the predetermined bit width for interfacing the at least one HSU to a predetermined number of the at least two LSU units, the second partition bus being partitioned into a third bus for interfacing the at least one HSU unit to the first subset of the at least two LSUs and a fourth bus for interfacing the at least one HSU unit with the second subset of the at least two LSUs. Wherein the first, second, third, and fourth busses of respective first and second partition buses have a bit width of at least the same size as the predetermined bit width to enable increased flexibility of signal transmissions to and from a SONET network. Preferably, the first and second partition buses have a bit width that is the same size as the predetermined bit width.

Also provided is a method for interconnecting at least one HSU with at least two LSUs in a SONET network interface to enable transmission of signals between the HSU and LSUs. The method comprises the steps of: interfacing the at least one HSU unit with each of the at least two LSU units by means of a common bus of predetermined bit width to enable transmission of signals from each of the at least two LSUs to the at least one HSU, and reception of the signals from the at least one HSU to each of the at least two LSUs: interfacing the at least one HSU to a predetermined number of the at least two LSUs by means of a first partition bus of the predetermined bit width for , the first partition bus being partitioned into a first bus for interfacing the at least one HSU to a first subset of the at least two LSUs and a second bus for interfacing the at least one HSU to a second subset of the at least two LSUs; and interfacing the at least one HSU to a predetermined number of the at least two LSU units by means of a second partition bus of the predetermined bit width, the second partition bus being partitioned into a third bus for interfacing the at least one HSU unit to the first subset of the at least two LSUs and a fourth bus for interfacing the at least one HSU unit with the second subset of the at least two LSUs, Whereby the first, second, third, and fourth busses of respective first and second partition buses have a bit width of at least the same size as the predetermined bit width to enable increased flexibility of signal transmissions to and from a SONET network. Preferably, the first and second partition buses have a bit width that is the same size as the predetermined bit width.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

The architecture of the flexible SONET access and transmission system of the present invention consists of the partitioning of the system functions onto different units and shelves, and the PCM data bus structures that interconnect the units and shelves.

PCM Bus Architecture

Figure 1A:
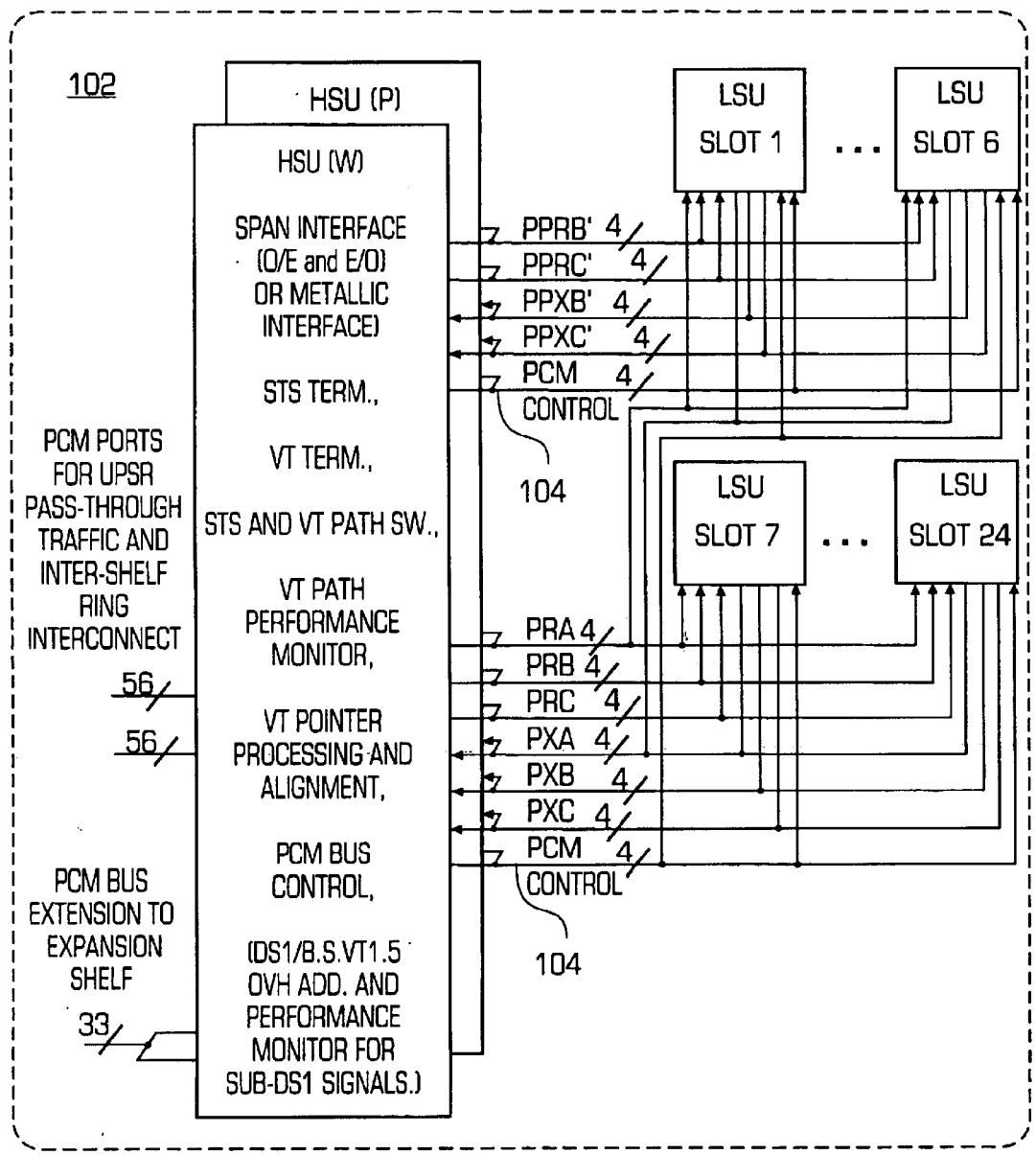
FIGS. 1a and 1b show schematics illustrating the PCM bus partitioning of a preferred embodiment of the flexible SONET access and transmission system of the present invention.

Referring now to FIG. 1a, in a preferred implementation, the PCM buses in the flexible SONET access and transmission system of the present invention comprises three transmit and receive bus pairs. In FIG. 1a, the transmit PCM buses are designated as PXA, PXB, and PXC, the receive PCM buses are designated PRA, PRB, and PRC. Each bus preferably consists of four parallel data lines for the PCM (i.e., a nibble-wide bus) and a byte status line that indicates what that byte contains. The A (or common) bus connects the high speed units (HSUs) (referred to as P and W where P designates the protection or standby unit and W designates the working unit) to all the low speed tributary interface units (LSUs) (referred to by their slot numbers 1–24) in a shelf 102. It is apparent to someone skilled in the art that a single HSU and any number of LSUs greater than two can be utilized in the system of the present invention without departing from the scope or spirit of the present invention.

The B and C buses are each partitioned into first and second subsets of LSUs. In the preferred implementation, B' and C' buses connect the HSUs to LSUs 1–6 and the B and C buses connect the HSUs to LSUs 7–24. The B and B' buses being alternatively referred to collectively as the first partition bus and individually as the first and second buses, the C and C' buses being alternatively referred to collectively as the second partition bus and individually as the third and fourth buses.

Figure 1B:
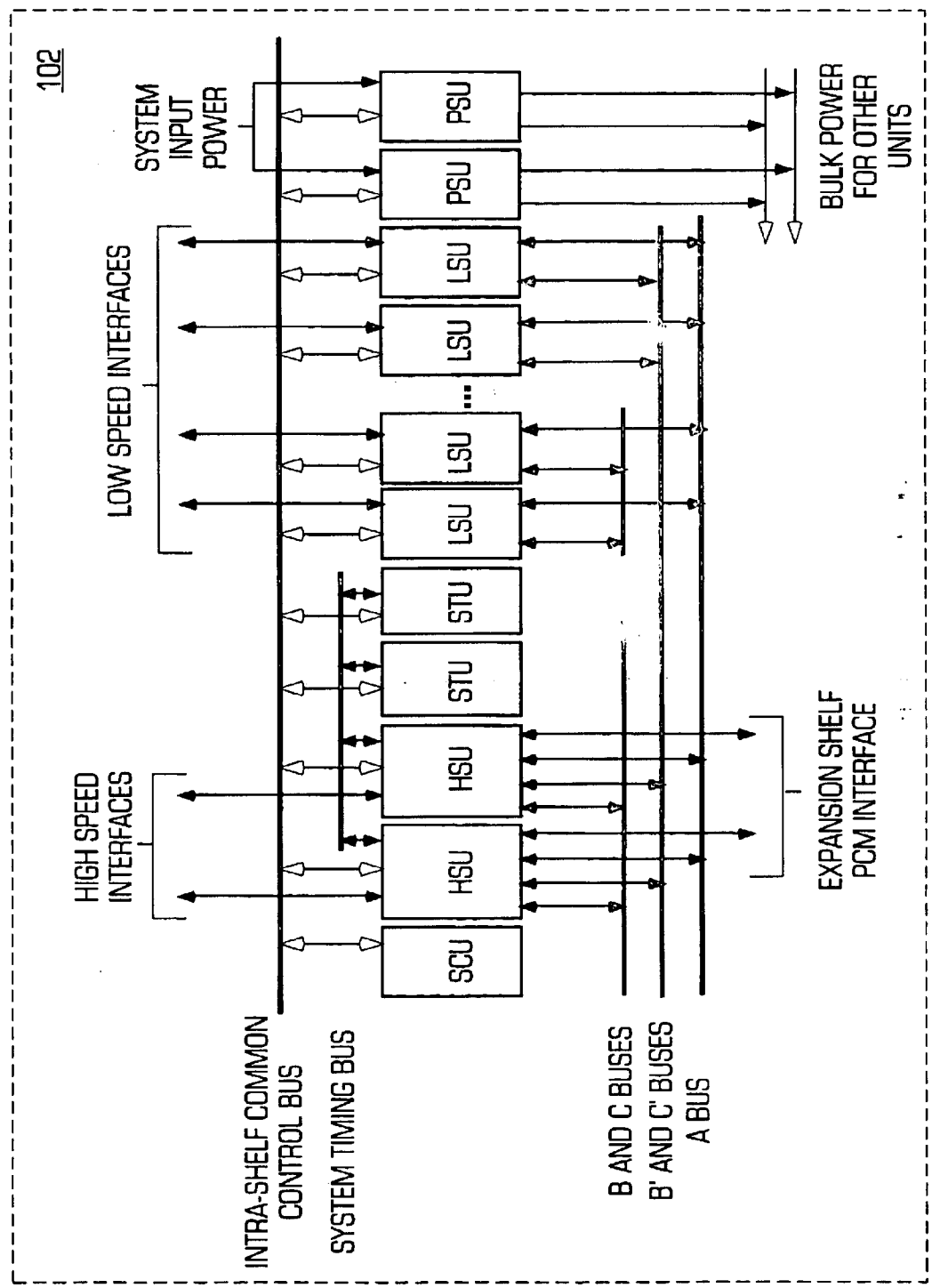

FIG. 1a illustrates this connectivity and partitioning in which the B' transmitting PCM bus is designated PPXB', the B' receiving PCM bus is designated PPRB', the C' transmitting PCM bus is designated PPXC', and the C' receiving PCM bus is designated PPRC'. FIG. 1a also illustrates PCM control signals 104 which include the per-bus byte status signal, a global PCM bus clock, and global receive and transmit SONET frame synchronization signals. The bandwidth and format of each of the A, B, and C buses is an STS-1. In other words, each bus operates at the STS-1 rate of 51.84 Mbit/s÷4 bits=12.96 Mbit/s. The bytes on a receive bus follow the sequence of the received STS-1 signal, and the bytes placed by the LSUs onto a transmit bus are arranged to form a valid STS-1 signal. FIG. 1b illustrates the same shelf 102 configuration as FIG. 1a but in greater detail, showing power supply units (PSU's), a system control processor unit (SCU), high speed SONET interface units (HSU's), and system timing and synchronization units (STU's), all of which are discussed below.

Figures 13, 15:
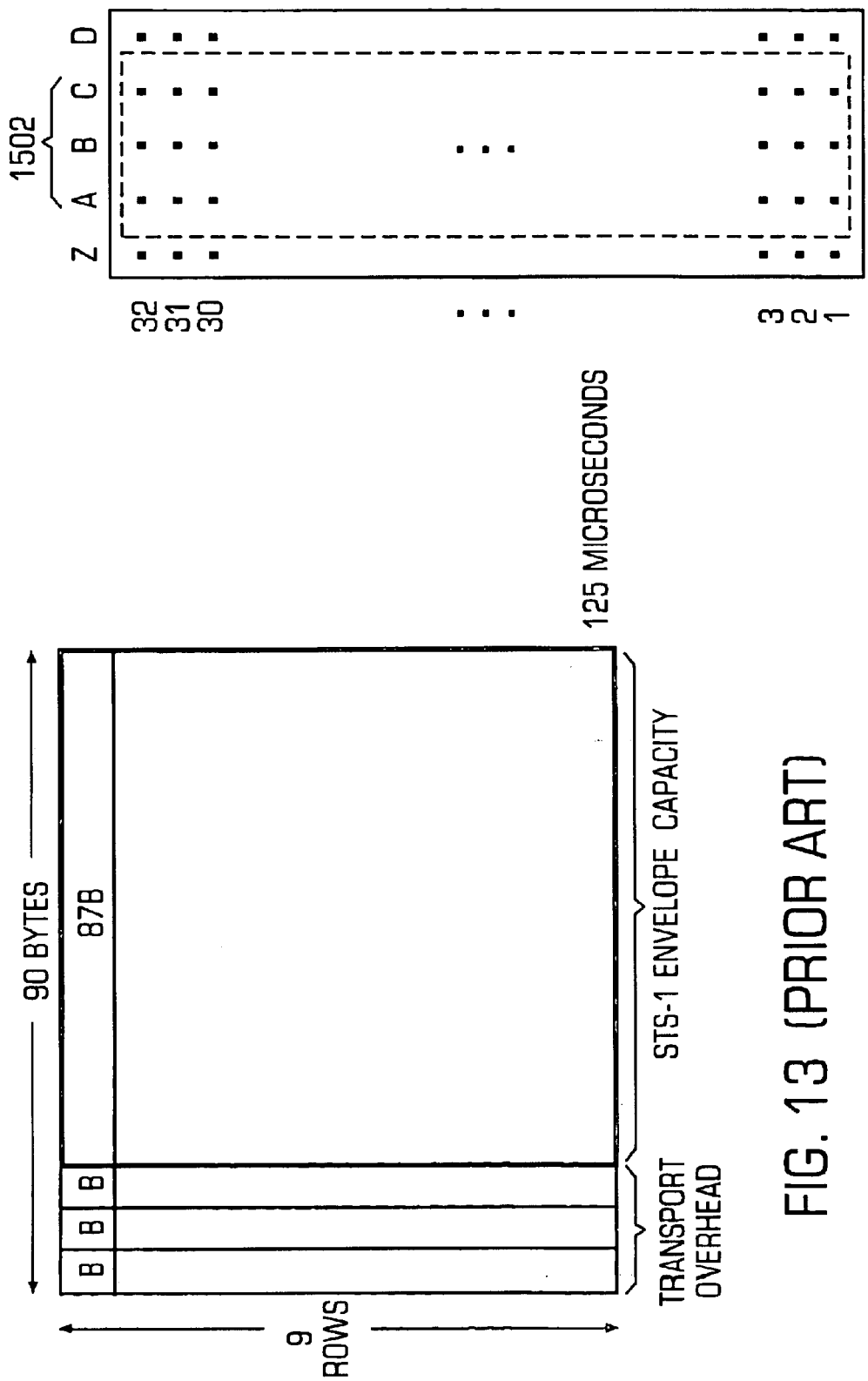
FIG. 13 shows a schematic illustrating the format of an STS-1 frame.
FIG. 15 shows a 160-pin backplane connector used in the preferred implementation of the system of the present invention to partition the LUS's.
Figure 14:
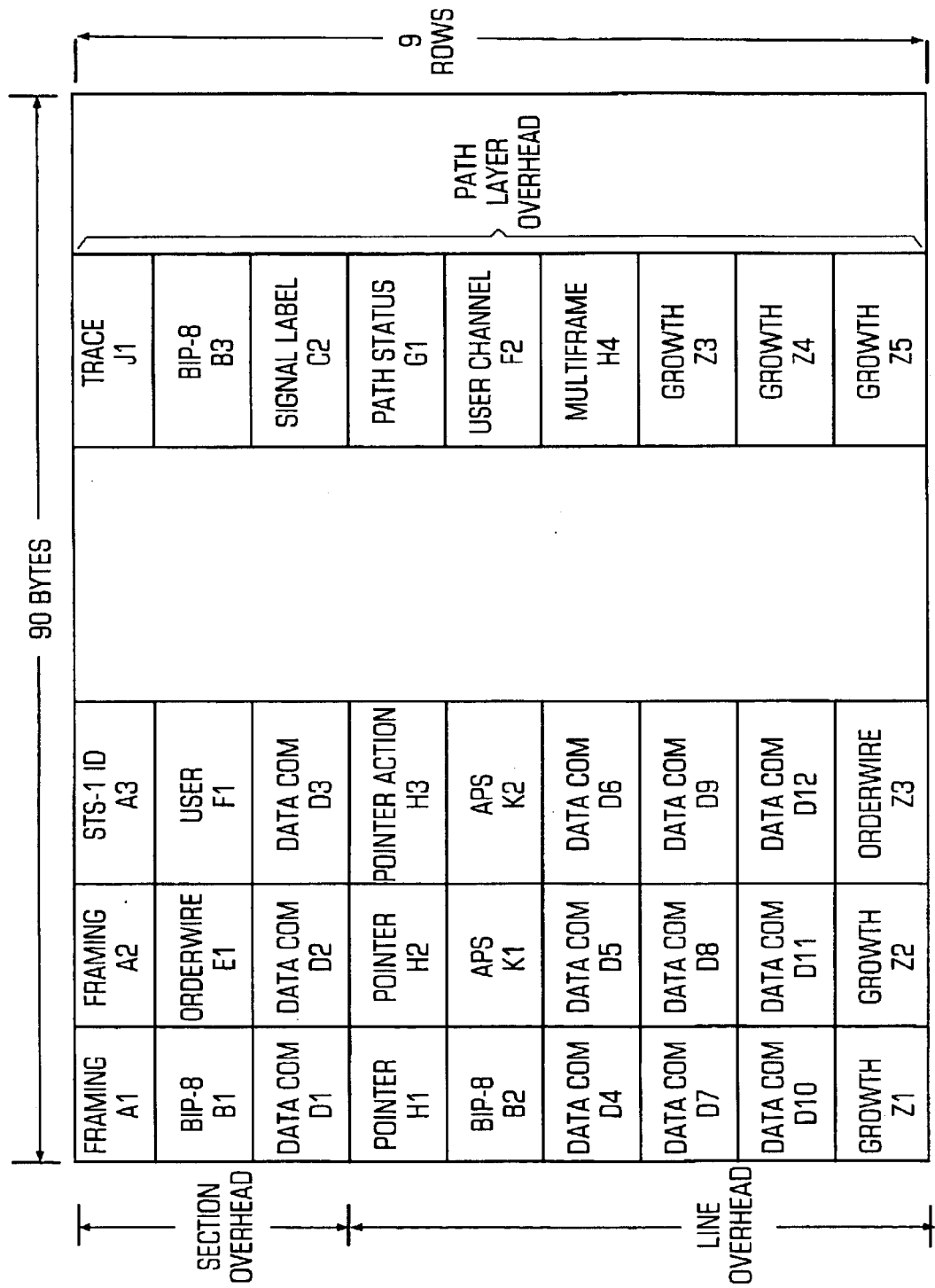
FIG. 14 shows a schematic illustrating the allocation of transport and path overhead bytes in the STS-1 frame of FIG. 13.

The units that occupy the LSU slots fall into four broad categories: (1) voice frequency channel units (CHUs) that only need to access a single STS-1, (2) wideband units (WBU) that need to access three STS-1s, (3) broadband units that use more than an STS-1 bandwidth within the unit, and (4) common processing units that do not provide a tributary interface, but monitor or modify the PCM data. A backplane connector used in the LSU slots is preferably partitioned so that those signals required by the CHUS, which are the most cost-sensitive units in the system, are contained in a subset of the connector. This allows CHUs to use a much cheaper connector than other LSUs. For example, in the preferred implementation of the system of the present invention a 160-pin VME64 connector 1500, illustrated in FIG. 15, is used on the backplane for each LSU slot. The connector 1500 is moderately expensive, however, it is capable of mating with a very low-cost DIN96 96-pin connector. The signals are partitioned so that CHUs can use DIN96 connectors instead of the more costly VME64 connectors. Here, the DIN96 connector uses the three inner rows (A, B, and C) 1502 of the VME64 connector. In addition, the signal partition allows the design of a low-cost backplane for CHU-only applications that is populated with the small connector (e.g., DIN96).

CHUs are primarily used in digital loop carrier (DLC) systems. The CHUs only need access to a single STS-1, because that is the size of the largest DLC switch interface. In the preferred implementation, the A buses are always assigned to the CHUs, and the A buses, as shown in FIG. 1, are common to all LSU slots (1–24). Making the A buses common to all LSUs simplifies the timing requirements of CHU PCM bus interface circuits and makes the CHU traffic visible to all slots in the system. The visibility to all slots makes it easier to install common processing units into the LSU slots to perform value-added DLC functions. For example, a DLC control termination or Dual-Tone Multiple Frequency (DTMF) signaling monitor can be installed in an LSU slot.

In normal operation, the B and B', and C and C' buses are physically/logically bridged by the HSUs (P and W) so that they behave as unpartitioned buses. The B and C buses are partitioned, however, in order to allow different traffic to be carried to the first six LSU slots (1–6) than to the remaining slots (7–24) on these buses. There are several examples for the need to use the B' or C' buses differently.

A first example is the system upgrade from OC-3 to OC-12 primary interface. The A, B, and C buses' combined capacity is three STS-1's (STS-3), so the entire OC-3 bandwidth can be carried in the backplane. This STS-3 capacity is only ¼ of the OC-12 bandwidth. However, in order to provide additional tributary interface bandwidth, the B' and C' buses can be operated at 38.88 MHZ (×4 bits= 155.52 Mbit/s capacity per bus). If the tributary units in LSU slots 1–6 can take advantage of this capacity (e.g., an OC-3 tributary unit or a dual 45 Mbit/s DS3 unit), then the tributary interface bandwidth of the system increases to nine STS-1s.

Figure 2:
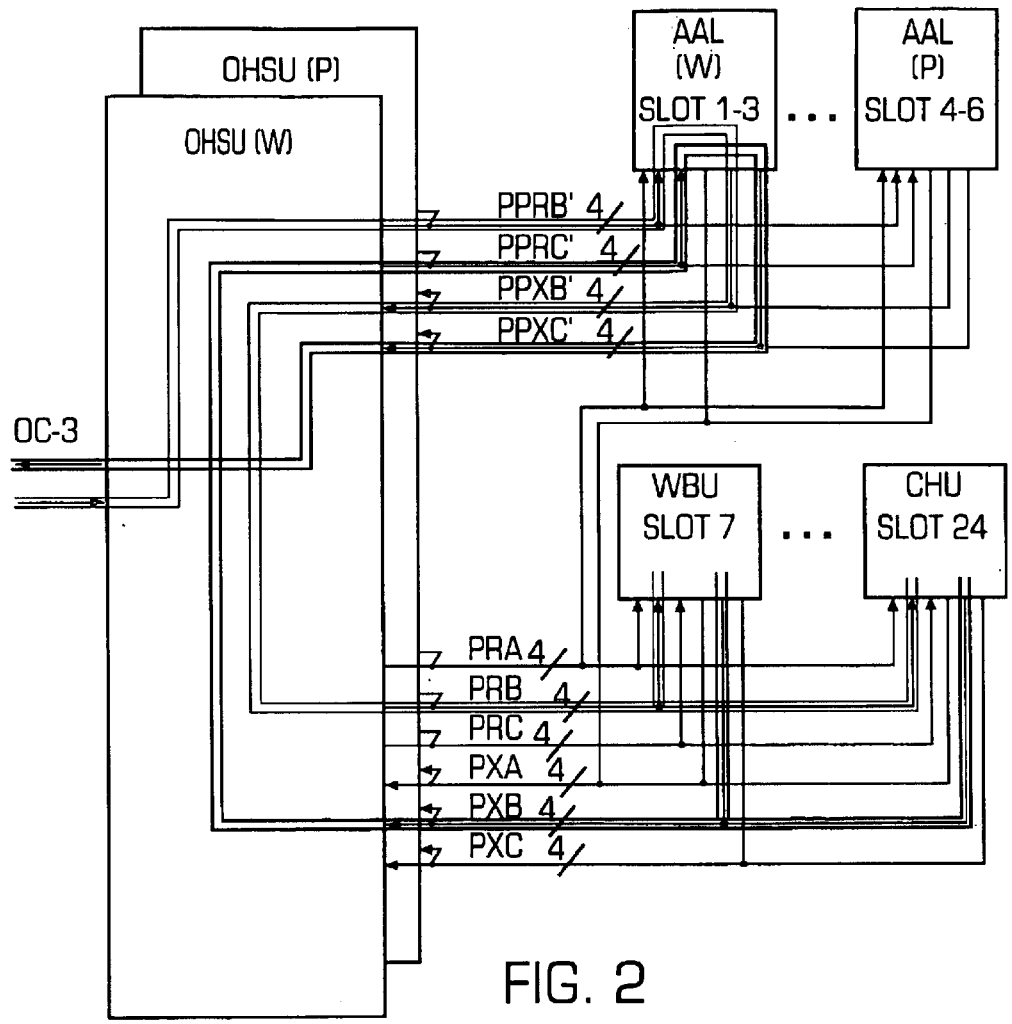
FIG. 2 shows a schematic illustrating the preferred system for common PCM ATM adaption layer processing as an example of common processing.

A second example is the case where an entire STS-3 payload needs some type of common processing. This example is illustrated in FIG. 2 for the case where the common processing is ATM Adaptation Layer (AAL) processing. Another potential common processing application is the DS1 and VT overhead for all sub-DS1 services terminated in the preferred system of the present invention.

A third example uses LSU slots 1–6 for the second set of optical span interface units in a linear add/drop multiplex (ADM) configuration (discussed more fully below).

In the preferred implementation, the number of buses and the bus width are set by several tradeoffs. Several systems of the prior art utilize a single bus with the entire STS-3 bandwidth common to all LSU slots. At 8-bits for the PCM data, this leads to 16 bits of bus (8 for transmit and 8 for receive) at 19.99 MHZ. The 19.99 MHZ rate is high enough to complicate the system design (due to bus interface timing restrictions).

Partitioning the bus into multiple buses adds 16 bus signals to the HSU for each partition. The choice of three sets of nibble-wide buses (24 bits overall) is made for the following reasons. First, the rate is reduced to 12.96 MHZ, which simplifies the interface timing constraints and also allows using the less expensive bus interface technologies known in the art. Second, it allows the CHUs to limit their PCM interface to a single 4-bit bus pair, which results in reduced cost of the units. Third, it allows partitioning the buses in an advantageous manner, as discussed above. Further, since there are two nibbles per byte of data, it takes two bus clock cycles to transmit each byte. Hence, the byte status signal can convey $2^2$ states of information about that byte. These states are (1) payload byte (e.g., part of the Virtual Tributary Synchronous Payload Envelope (VT SPE) or STS-1 SPE for non-VT payloads), (2) V5 overhead byte of the VT or the J1 byte of the STS-1, (3) SONET overhead byte, and (4) Path AIS indication for that VT (or STS-1). A byte-wide bus would require two byte status signals to carry the same state information. Thus, the nibble-wide format is more efficient.

Figure 3:
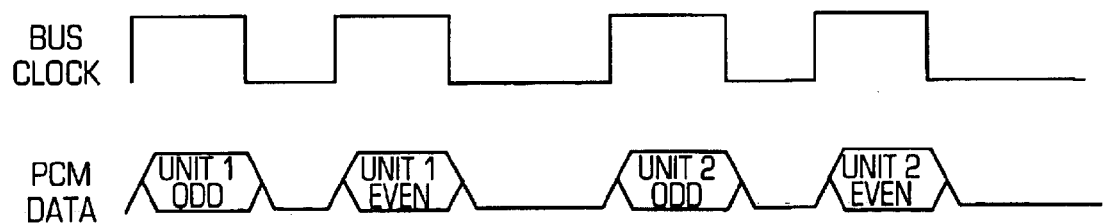
FIG. 3 shows an example of asymmetric PCM bus timing.

Data can be placed onto the nibble-wide buses in either the format of the odd numbered bits in the first nibble and the even numbered bits in the second nibble, or in the format of the high nibble followed by the low nibble. The partitioning of the byte into odd/even rather that high/low nibble means that the same unit drives the bus line for both clock cycles of that byte down to a 16 kbit/s resolution. For example, the ISDN Basic Rate D-channel is a 16 kbit/s channel and occupies two adjacent bits of an 8-bit channel. A high/low partition would require a different unit to drive the bus during each of the nibbles. The odd/even partition allows the same units to drive their respective bus bits for both clock cycles. Having the same unit driving the bus for both clock cycles further simplifies the bus interface timing. For example, it can allow an asymmetric duty cycle as shown in FIG. 3 where more time is left between bytes than between nibbles in order to avoid any overlap between units driving the bus. To simplify the clock generation, however, the preferred implementation of the system of the present invention implements the high/low nibble format.

Partitioning of Functions Between High Speed Units and Low Speed Tributary Units FIG. 1 also illustrates the functions that are performed on the HSUs (P and W). Specifically all of the Line, Section, STS Path, and VT Path termination functions are performed on the HSUs (P and W). This centralized location for all of these functions simplifies the system software by reducing the locations that it must query to determine the status of the PCM connections. With the exception of the sub-DS1 LSUs (e.g., the CHUs), the LSUs insert all of the VT Path information for the transmit data. In other words, an LSU inserts a completely formatted VT onto the backplane transmit buses. The HSUs (P and W) are responsible for adding all of the STS Path overhead, and STS-N Section and Line overhead to the transmitted signal. It is appreciated by those in the art that DS3 and STS-N LSUs place a fully formatted STS-1 onto the backplane bus, and the HSU does not need to add STS-1 Path overhead to this data.

For sub-DS1 LSUs, the HSUs (P and W) may serve as the common location where the DS1 and VT1.5 overhead information is added to the transmit data. The received DS1s may also be terminated on the HSUs (P and W). Since the DS1s are carried in byte-synchronous format, there is no need for DS1 framing circuits for the received data.

Preferably, unidirectional Path-Switched Ring (UPSR) VT and STS Path switching is performed on the HSUs (P and W). As discussed below, a connection exists between the two HSU slots that allows each HSU to pass all of its received data to the other HSU. This data undergoes pointer alignment to the system frame reference prior to being passed to the other HSU so that the data a HSU receives on its own facility and the data it receives from the other HSU are aligned. A byte status signal is transmitted-with the data that indicates whether that VT or STS Path is in AIS (Alarm Indication Signal). A HSU performs Path switching prior to placing data onto the backplane. The Path choices are its own received VT/STS or the equivalent VT/STS from the other HSU. If the selected Path is in AIS, then the HSU automatically switches to the other Path for its received data. When both Paths for a given VT/STS are experiencing bit errors, then the HSUs communicate with each other over the system control communication bus (ARCNET in the preferred implementation of the system of the present invention) so that the least-degraded Path is the one selected to be dropped.

Time Slot Interchange

The time slot interchange (TSI) in the preferred implementation of the system of the present invention is performed using the backplane as the main switch fabric. For an OC-3 system, each LSU (1–24) can read their received data directly from any time slot in the STS-3, and can place their transmit data into any time slot. The remaining TSI function is known as "hairpinning" and allows connecting data directly between two tributary units without appearing on the high-speed interface. This function is also accomplished by having LSUs exchange data in un-used backplane time slots. For that data that must be hairpinned between units using the B and B' buses, for example, the HSU provides the physical bridge between the two bus partitions during the hairpin time slot. The LSU that places data onto the PCM bus for a hairpin connection also drives the byte status signal. Note that the byte status signal eliminates the need for individual asynchronous tributaries (e.g., DS1) to perform VT or STS-1 pointer processing in order to locate the V5 or J1 bytes.

Figure 4A:
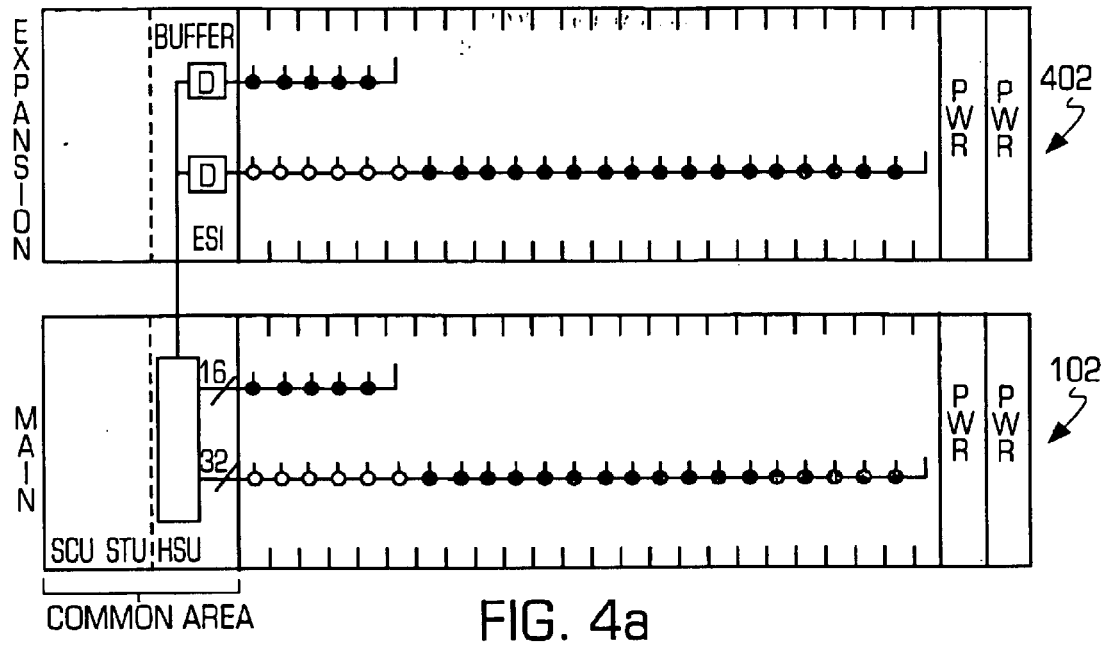
FIG. 4a shows a PCM bus extension for an expansion shelf for use with the flexible SONET access and transmission system of FIG. 1.

Referring now to FIG. 4a, in order to expand the number of tributary units in the system with a minimum amount of additional cost, the system supports adding at least one expansion shelf 402. The expansion shelf 402 is physically identical to the main shelf 102. However, unlike the main shelf 102, which requires the system control processor unit (SCU), high-speed SONET interface units (HSUs), system timing and synchronization units (STUs), and power supply units, the expansion shelf only needs power supply units and an expansion interface unit (ESI). The ESI unit resides in the HSU slot and simply provides clocked buffers for exchanging PCM data between the main 102 and expansion shelves 402. In order to have the transmit data from the expansion shelf 402 arrive at the HSU with the same frame alignment as the transmit data from the main shelf 102, the transmit frame reference signal is sent from the HSU to the ESI unit ahead of the main shelf transmit frame reference signal. The time difference between the two reference signals is equal to the number of clocks of delay that the transmit data will incur as it is re-timed going through the ESI in route to the HSU.

For preferred configurations other than OC-12 (i.e., for OC-3 or three STS-1), Time Slot Interchange (TSI) functions are preferably implemented by time slot assignment on the backplane rather than using an integrated circuit as the switch matrix. The preferred OC-12 configuration preferably relies on VLSI TSI circuits due to the need for TSI across the entire STS-12 bandwidth. Similarly, for OC-48 the TSI functions are preferably implemented in VLSI on the HSU. Here, however, the VT TSI may only operate across a subset of the 48 STS-1s (e.g., access 12 of the 48 STS-1s).

For an OC-3 configuration (i.e., three STS-1 systems), all low speed units have access to the entire STS-3 system bandwidth, and hence can perform full VT TSI by time slot assignment. Each LSU is provisioned for the receive bus time slot from which it receives its drop data and the transmit bus time slot in which it places its add data. The tributary "hairpinning" function (i.e., direct exchange of PCM between tributary units rather than exchanging data with the HSUs) is implemented between the LSUs associated with those tributaries by using time slots on the transmit and receive PCM buses. For example, if units A and B are connected with a hairpin for one VT, unit A sends its VT to unit B on the receive bus and unit B sends it VT to unit A on the transmit bus. This requires that each tributary unit be capable of transmitting or receiving PCM from either the transmit or receive buses. The HSUs make the required connections between buses to allow hairpin connections between units that use the prime buses, non-prime buses, and units in the expansion shelves.

If a time slot that is being used for a hairpin connection is subsequently required for an add/drop connection between the HSU and LSU, the hairpin connection must be moved to another time slot. This time slot move is accomplished with the following three steps. First, both of the hairpinned LSUs are provisioned to place their data onto the PCM buses in the time slot they are currently using and the time slot to which they will move. Second, both LSUs take their data from the PCM bus in the new time slot. Third, the LSUs are provisioned to only add their data onto the PCM buses in the new time slot. At this point, the original time slot is available to be used for the new add/drop connection. In order to prevent data errors during the move to the new time slot, the LSUs switch to taking their data from the new time slot during a SONET transport overhead byte time slot. Since the transport overhead bytes are processed on the HSUs, they contain only dummy data on the PCM buses.

Since individual units only see three STS-1s of bandwidth, it is not possible to use the backplane for TSI across the STS-12 or STS-48 bandwidth. VSLI TSI circuits are required for this application. The OC-12 HSU must terminate up to 336 VT and 12 STS-1 paths. The OC-48 HSU will either terminate all 1344 VT and 48 STS-1 paths or a subset of them (e.g., 12 STS-1 and 336 VT paths). The VLSI circuits on the HSUs are capable of dropping and adding up to 84 VTs in the main shelf 102 (i.e., up to the PCM bus capacity) and an additional 84 VTs in the expansion shelf 402. The VLSI circuits on the HSU's are also capable of putting any three STS-1 payloads to the B' or C' buses. Similarly, each IRI unit must be capable of dropping and adding any of the 84 VTs to it's shelf and an additional 84 VTs to its expansion shelf.

An optional low-cost reduced-function TSI option is possible in which the TSI at any given OC-12 node is restricted within a single STS-3 (i.e., group of three contiguous STS-1s). This option alleviates the need for the VLSI TSI and keeps all TSI on the backplane as in the OC-3 system configuration. It also limits the VTs to be terminated to 84 VTs instead of 336. Those DS1s in which DS0 TSI is required use byte-synchronous VT1.5 mapping on the backplane. The byte-synchronous VT1.5 mapping allows DS0 visibility within the SONET payload so that DS0 TSI can be performed in the same manner as VT TSI. The DS1 and byte-sync VT overhead processing can be performed by either the HSU unit, the tributary interface unit, or both units, depending on the application. Note that quarter-DS0 TSI is performed by time slot assignment in the same manner as DS0 TSI.

ATM Cell Multiplexing

Figure 4B:
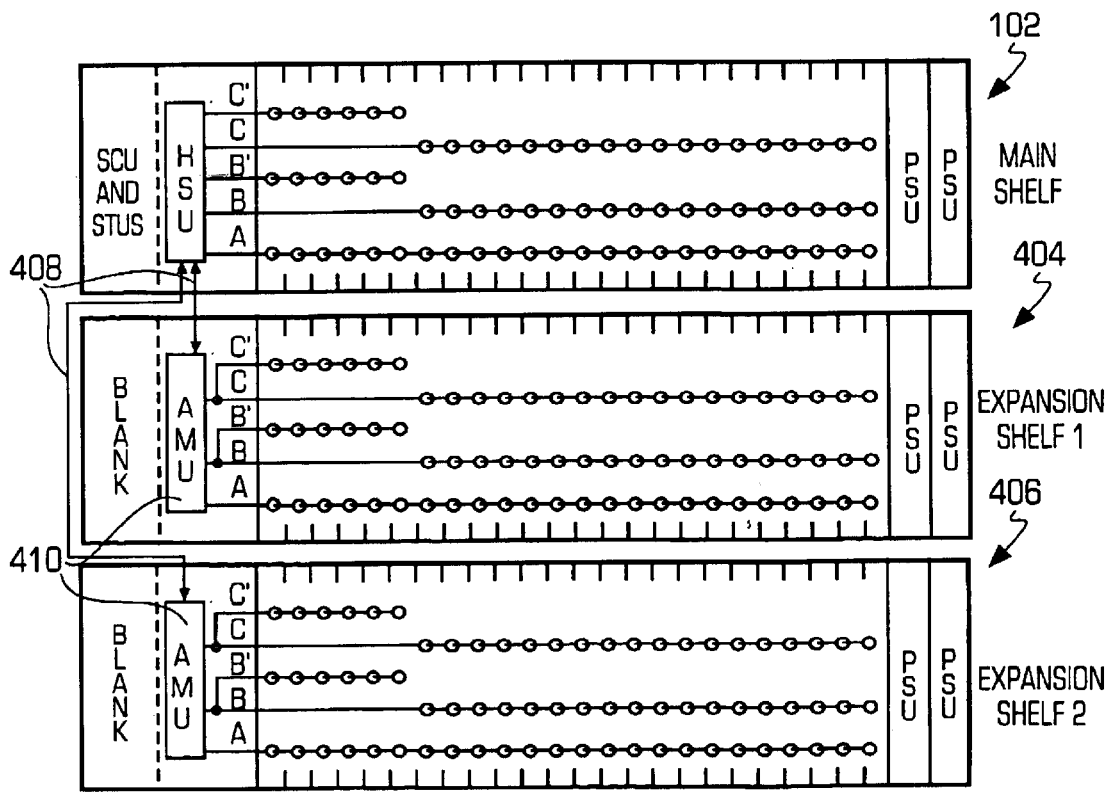
FIG. 4b shows an ATM cell multiplexing configuration having two expansion shelves for use with the flexible SONET access and transmission system of FIG. 1.
Figure 5:
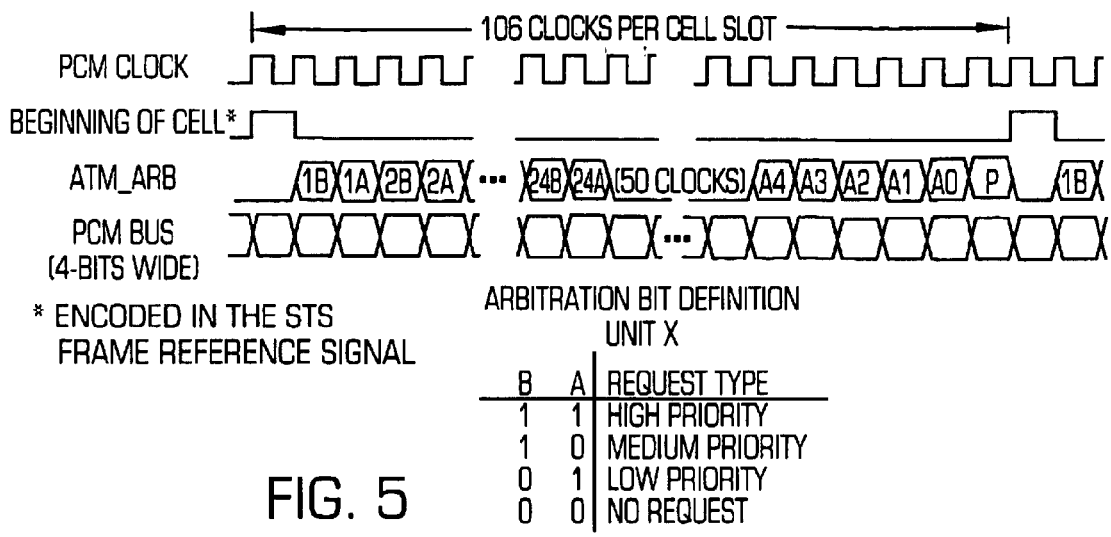
FIG. 5 shows a timing diagram illustrating an ATM cell bus access arbitration protocol.

Referring now to FIGS. 4b and 5, there are two preferable ATM cell TSI approaches for the system of the present invention. The first approach is to use separate shelves for STM and ATM services. The second approach allows STM and ATM services to be mixed in the same shelf.

In the first approach, all ATM services are located in an expansion shelf. The main shelf 102 of the present invention provides one STS-1 to a single shelf or one STS-1 to two expansion shelves 404, 406. Thus, in this embodiment, the main shelf 102 interfaces to two expansion shelves 404, 406. In order to support the two expansion shelves 404, 406, an expansion shelf cable 408 connects the B PCM buses to one expansion shelf and the C PCM buses to the other shelf. An expansion cable connector duplicates the PCM clock and receives frame pulse signals (i.e., places them on two pins each) in order to simplify the cable construction.

The HSU slot in the expansion shelf is occupied by the ATM Multiplex Unit (AMU) 410. In the receive direction, the AMU receives an STS-1 from the main shelf HSU over the expansion cable 408 and places the cell payload onto the expansion shelf backplane for the LSUs to receive. In the transmit direction, the AMU collects the cells from the LSUs in the expansion shelf, multiplexes them into a DS3 or STS-1, and passes a fully-formatted STS-1 signal back to the main shelf HSU over the expansion cable 408.

The PCM buses in the expansion shelves 404, 406 are used in a different manner than in the main shelf 102. Instead of being separated into transmit and receive STS-1 buses a single parallel bus is used. The arbitration control for assigning the user of each cell slot is located on the AMU 410. The AMU 410 also processes all OAM cells. The OAM cells are removed from the receive cell stream and are inserted into the transmit cell stream internal to the AMU, and do not appear on the bus.

In the second approach, the backplane provides the multiplex and switch fabric for ATM cells within the STS-1 signal format of the individual PCM buses. The ATM cell arbitration technique (to access the backplane cell slots to transmit ATM cells) is preferably implemented through arbitration lines that are used by each ATM interface unit to request a cell slot from a central arbitration unit. Preferably the backplane PCM buses are partitioned such that a portion of the STS-3 capacity can be reserved for STM traffic. At a minimum granularity, it is possible to use one STS-1 signal on any one of the buses for STM traffic while the remaining two buses are used for ATM traffic. However, the three buses can be arranged in any combination of STM and ATM traffic.

The ATM cell bus access arbitration protocol is illustrated in FIG. 5. The PRSTAT (byte status signal for receive buses) and PXSTAT (byte status signal for import buses) signal lines are used for ATM cell arbitration (labeled ATM_ARB in FIG. 5). There is one of these signals available for each of the 4-bit wide PCM buses, so cell arbitration is available on a per-bus basis. There are 106 clocks required to transmit a single, 53 byte ATM cell. Note that each cell slot will also in practice take at least two more PCM clock periods due to SONET fixed stuff and overhead columns. The beginning-of-cell-slot location information is encoded into the PRFP or PXFP signal. Each LSU, has a unique point during the cell slot to make its arbitration request. Specifically, each LSU has two clock cycles on the ATM_ARB line during which it can log its request to transmit a cell. Those clock cycles occur sequentially by LSU slot after the beginning-of-cell-slot indication, as shown in FIG. 5. The two bits indicate four states: high priority cell request (e.g., for CBR service), medium priority cell request (e.g., for VBR service), low priority cell request (e.g., for ABR service), and no request. In the preferred embodiment, the HSU acts as the master for bus arbitration and is responsible for choosing which LSU will place its cell into the next cell slot, however, any unit on the PCM buses could act as the master. The HSU uses the last six clock periods of the cell slot to transmit the identification of the LSU that is allowed to transmit its cell in the next cell slot. The address here is the LSU slot number. A parity bit (odd parity) is used over this granted-unit address to insure that there is no bus conflict due to errors on the ATM_ARB signal.

If multiple shelves are connected by the system intershelf shelf ring interface, then an additional arbitration means is required to determine which shelf supplies each ATM cell for the transmit fiber. The SONET transport overhead bytes do not contain useful data in the intershelf ring interface, so they are available to be used for the ATM cell slot arbitration. The add ring connection is used by each shelf to indicate the number and priority of the cells that it has to add. The bits used by each shelf for arbitration are determined by that shelf's address on the ring. The drop ring connection is used by the HSU to indicate which shelf is allowed to place an ATM cell into the next cell slot.

Pass-through Connections for Unidirectional Path Switched Rings (UPSR) and Intershelf Connection within the same Network Element The expansion shelf interface from the main shelf 102 to a single addition shelf 402 was discussed above. In applications where additional shelves are needed to access the OC-N bandwidth (e.g., when VF units are the low-speed units with OC-3 or when the high-speed units are OC-12 or OC-48 units) an additional intershelf connection is provided. This intershelf connection is referred to hereinafter as the Intershelf Ring Interconnection (IRI). The IRI ports from the OC-N units are also used for the pass-through connections in UPSR network topologies. The main advantage of using an intershelf ring instead of a point-to-point star arrangement is that it reduces the system cost by reducing the number of common interconnection units. With a star configuration, the wideband system main shelf 102 must have at least one interface unit for interconnection with each additional shelf in the system. With a ring/dual bus configuration, only a single interface unit is required in the wideband main shelf for interconnection, and this interface unit is the HSU. If the interconnection link is protected, then there are twice as many interface units, which further increases the cost advantage of a ring interconnection approach. A second related advantage of the ring configuration is that it reduces the total number of cables required for interconnection. A third advantage of the ring configuration is that it allows a simple protection mechanism for the interconnection.

Figure 6A:
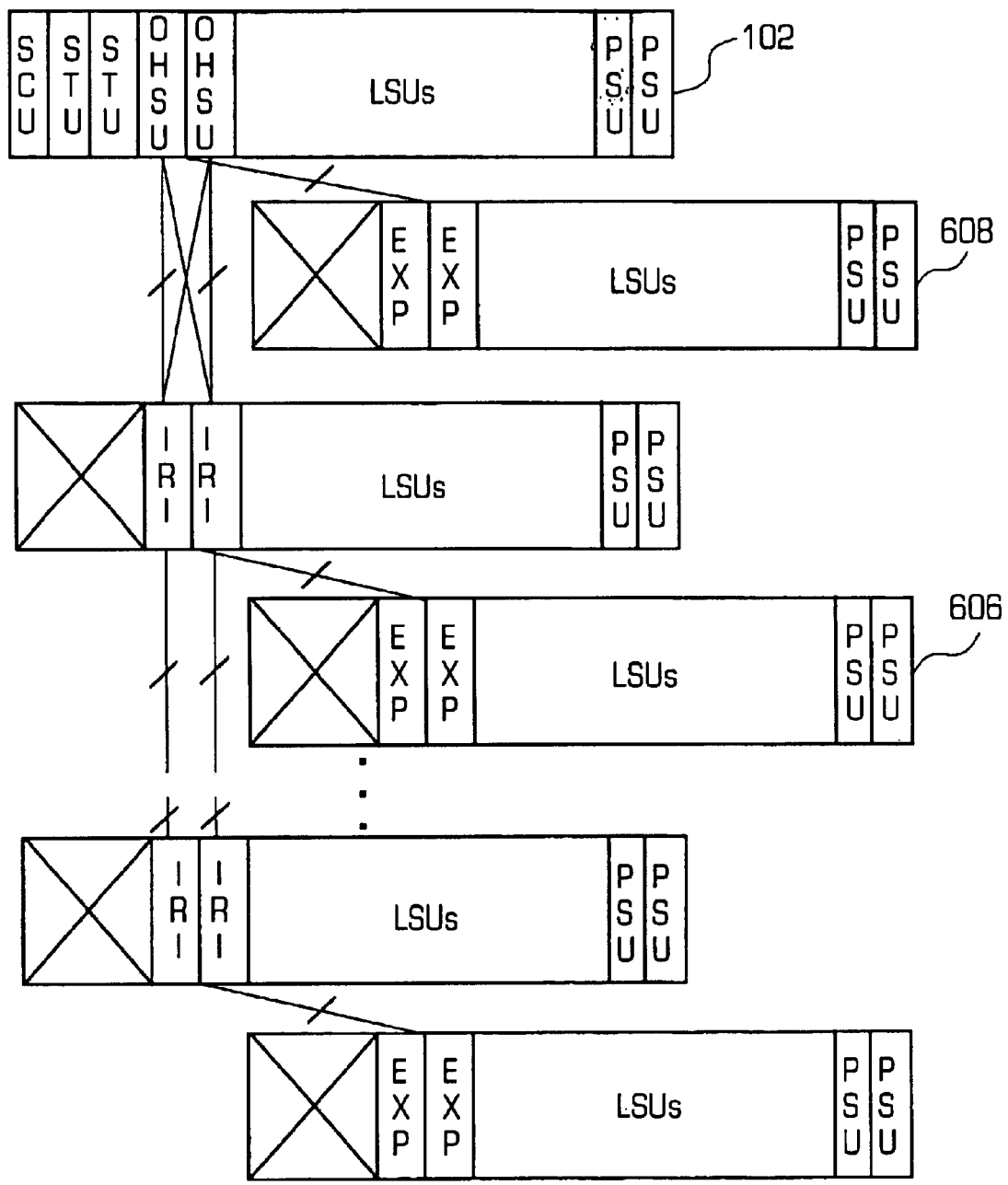
FIGS. 6a and 6b show a schematic illustrating an inter-shelf ring with UPSR pass-through for use with the flexible SONET access and transmission system of FIG. 1.
Figure 6B:
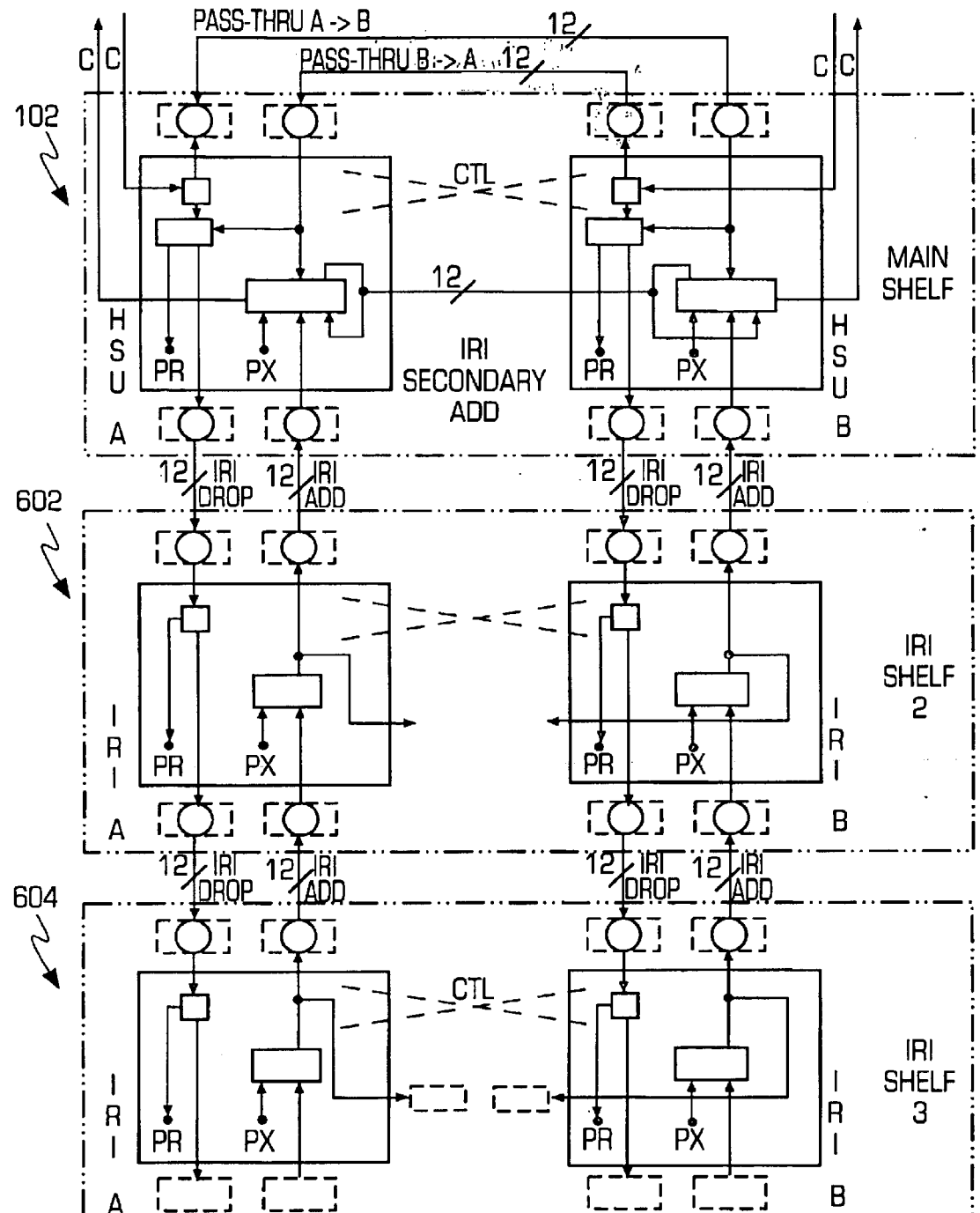

The intershelf ring with UPSR pass-through is illustrated in FIGS. 6a and 6b. This bus is physically connected by point-to-point links between the shelves 102, 602, 604. Within each shelf 102, 602, 604, the intershelf ring connections go to the HSU slots so that the intershelf ring can have access to the full system bandwidth and so that no tributary slots are wasted by the interconnection. The medium is preferably twisted pair cables using differential drive.

Figure 7:
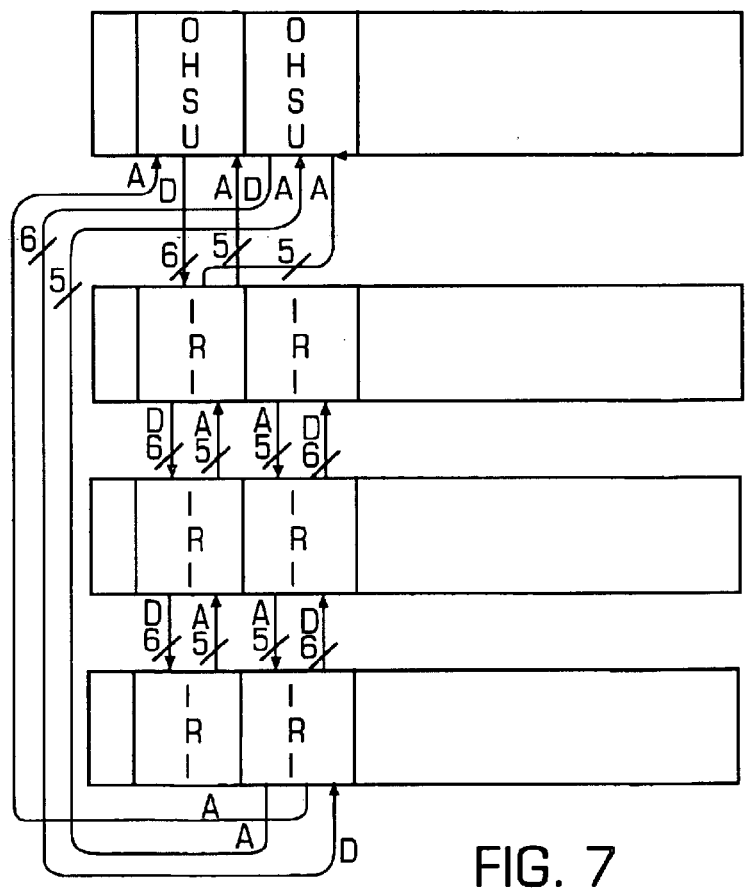
FIG. 7 shows a schematic illustrating a counter-rotating intershelf ring configuration for use with the flexible SONET access and transmission system of FIG. 1.

The actual topology of the ring more closely resembles a dual bus in which data propagates from the main shelf 102 down through each shelf 602, 604 on the Drop buses and is accumulated on the Add buses as they pass through each shelf on the way to the main shelf 102. The main shelf 102 here is the shelf containing the OC-N units. The topology is a "ring" only with respect to the timing. The last shelf 604 on the Drop bus chain preferably uses the incoming Drop bus clock as the timing source for the Add bus. The last shelf 604 also is preferably responsible for generating the frame and SPE reference (Byte Status) signals for the Add buses. The Add frame reference is generated such that when the Add data arrives at the main shelf 102 it will be aligned with the data from the transmit PCM buses of the main shelf 102. As shown in FIG. 7, it is possible to connect the intershelf ring as a counter-rotating ring topology. However, the counter-rotating topology is more difficult from the standpoint of cabling and IRI unit provisioning.

The signals used on the drop and add bus varies, depending on whether the system of the present invention is an OC-3 or OC-12 system. The signal usage is summarized in table 1. The STS frame reference information is encoded into the Byte Status signal for both OC-3 and OC-12 applications. Finding the alignment of the Byte Status signal requires a rudimentary framing algorithm, so the OC-3 application preferably includes an optional, separate frame reference signal that allows a simplified implementation with no framing circuit. In other words, the OC-3 application can optionally choose to acquire the byte status alignment directly from the frame reference signal without needing a framing circuit, or indirectly by framing on the Byte Status signal reducing the number of interface signals. In the Add direction, the Byte status information is not needed for the Add buses, since these signals are only multiplexed in the HSU and not accessed or cross-connected. The pass-through connection ports, as illustrated in FIGS. 6a and 6b, always pass the bytes status information.

TABLE 1

Intershelf Ring signals

| Signal | OC-3 Usage | OC-12 Usage | OC-48 Usage |
|---|---|---|---|
| Drop Signal 1 | PCM data (STS-1 #1) | PCM data (STS-3 #1) | PCM data (STS-1 #1–8) |
| Drop Signal 2 | PCM data (STS-1 #2) | PCM data (STS-3 #2) | PCM data (STS-1 #9–16) |
| Drop Signal 3 | PCM data (STS-1 #3) | PCM data (STS-3 #3) | PCM data (STS-1 #17–24) |
| Drop Signal 4 | STS frame reference signal (optional) | PCM data (STS-3 #4) | PCM data (STS-1 #25–32) |
| Drop Signal 5 | Byte Status for all three STS-1s | Byte Status for all four STS-3s | PCM data (STS-1 #33–40) |
| Drop Signal 6 | Clock | Clock | PCM data (STS-1 #41–48) |
| Add Signal 1 | PCM data (STS-1 #1) | PCM data (STS-3 #1) | PCM data (STS-1 #1–8) |
| Add Signal 2 | PCM data (STS-1 #2) | PCM data (STS-3 #2) | PCM data (STS-1 #9–16) |
| Add Signal 3 | PCM data (STS-1 #3) | PCM data (STS-3 #3) | PCM data (STS-1 #17–24) |
| Add Signal 4 | STS frame reference signal (optional) | PCM data (STS-3 #4) | PCM data (STS-1 #25–32) |
| Add Signal 5 | Clock | Clock | PCM data (STS-1 #33–40) |
| Add Signal 6 | . . . | . . . | PCM data (STS-1 #41–48) |

As illustrated in FIGS. 6a and 6b, there are preferably redundant Drop buses and Add buses in order to allow protection of the IRI. Each segment of an Add or Drop bus originates or terminates on one of the HSUs or IRI units in a shelf. Protection for the IRI is performed at the Line level. At a subtended shelf, this means that one of the IRI units is the source for all receive PCM data being placed onto the backplane or expansion shelf interface. If there is a failure in the IRI path that passes through that on-line IRI unit, that shelf switches to using the other (standby) IRI unit as the source of its PCM data. At the main shelf 102, both HSUs (P and W) need access to the Add data from both IRI Add buses. Otherwise, a failure in one of the IRI Add buses (including the removal of an IRI unit) would prevent the Add data from the subtended shelves from reaching that HSU. The secondary Add buses provide the connection between the HSUs and the other IRI Add buses. When the primary Add bus input to a HSU fails, it requests the other HSU to place its received Add bus data onto the secondary Add bus. A failure of an IRI bus is detected as loss of signal on one of the bus connections (e.g., clock, data, or byte status). Loss of signal here is defined as no transitions on a signal within a 250 μs period. The protection switch is performed by the on-line and standby IRI units. After switch completion, the IRI unit that is now providing data to its shelf informs the SCU in the main shelf of the failure. An IRI unit that detects a failure preserves the failed condition on the data it transmits to the downstream shelves 602, 604 so that the failure is visible to them in order that they may also take appropriate protection action.

The protection switch state machine inputs for the IRI unit are the condition of that unit's own ring inputs, the condition of the other IRI unit's ring inputs, and SCU commands to either lock out switching or to perform a manual switch. IRI protection switching is non-revertive, with the IRI unit that is on-line not keeping memory of how it came to be the on-line unit. As an example, consider the sequence where: (1) a first IRI unit 606 is the on-line unit and detects a signal failure due the removal of an upstream IRI unit; (2) A protection switch is performed and a second IRI unit 608 becomes the on-line unit; (3) The upstream IRI unit is replaced; and (4) the second IRI unit 608 detects a signal failure due to another upstream IRI unit being removed. After step (3), the second IRI unit 608 continues to be the on-line unit since the switching is non-revertive. After step (4), the second IRI unit 608 negotiates with the first IRI unit 606 to perform the protection switch. Since the first IRI unit 606 no longer sees a signal failure, it will accept the protection switch and become the on-line unit. If the first IRI unit 606 still sees a signal failure, it would deny the attempt to switch back. When an IRI unit sees a failure condition removed, it notifies the other IRI unit of its change of state so that if that IRI unit was previously denied a protection switch request it can make another request for switching. Switch requests and status information are carried over any intrashelf communication bus known in the art, such as an ARCNET bus. In addition to the ARCNET messages, the IRI units also detect each other's presence through a "partner-present" connection in the same manner as the HSUs. If the on-line IRI unit is removed or experiences a unit failure, the other IRI unit detects it through it's partner-present input and performs the protection switch.

All VT Path switching for UPSR is performed by the HSUs prior to placing the PCM data onto the IRI Drop buses. This capability is supported by all HSU hardware releases. Thus, for UPSR configurations, the data on both Drop buses is exactly the same, and there is no need for the IRI units to perform any Path switching. For OC-48 systems, this path switching could be moved to the IRI units to make a more modular growth of the path switching circuitry. For linear applications, each HSU places its own received data onto its IRI Drop bus.

The Intershelf ARCNET LAN is preferably used for communications between the shelves on the intershelf ring, however, any number of commercially available alternatives can be used, such as Ethernet. Specifically, the IRI unit in the subtended shelf uses the Intershelf ARCNET LAN to communicate with the SCU in the main shelf. All provisioning commands and status messages between the SCU and the units in the subtended shelves come over the Intershelf ARCNET connection with the IRI units performing the LAN bridge function between the Intershelf ARCNET and the local ARCNET common control bus in that shelf. The address of each subtended shelf on the intershelf ring is determined by manipulation of the J0 byte in the overhead of each IRI Drop PCM signal. The SCU in the main shelf 102 uses address 00000001. The HSUs (P and W) in the main shelf 102 set the J0 value on the PCM data Drop data to a value of 11100000. This value is used as the address by the shelf 602 adjacent to the main shelf 102 on the intershelf ring. The IRI units in this shelf 602 increment the address by two to 11100010 when they transmit the Drop PCM data to the next shelf 604. Each shelf on the intershelf ring in turn uses its received J0 value as its address and increments the J0 value as it is sent to the next shelf. The LSB of the J0 value distinguishes between the two IRI units in that shelf.

Figure 8:
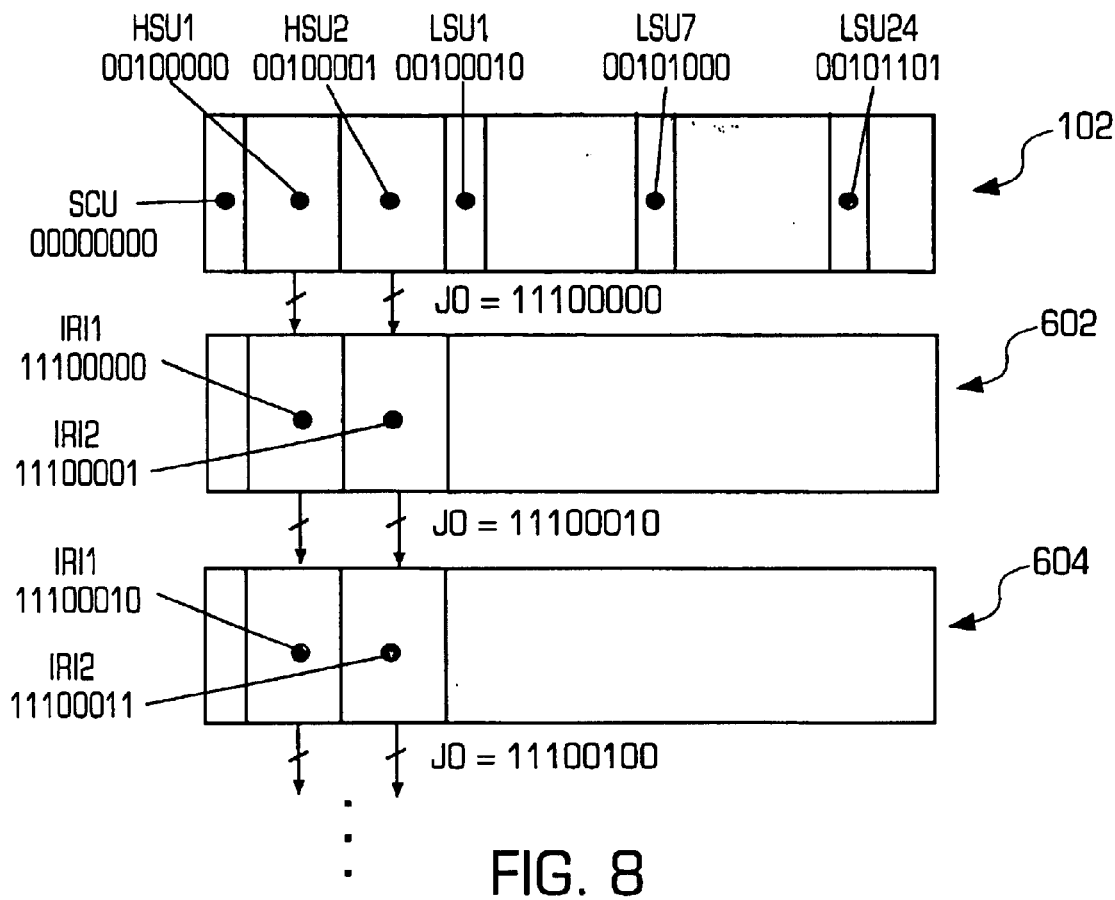
FIG. 8 shows a schematic illustrating an intershelf ARC-NET bus address for use with the flexible SONET access and transmission system of FIG. 1.

The values 001xxxxx are used by units in the HSU or LSU slots in the main shelf 102 in order to allow direct communication between a subtended shelf and a unit in the main shelf. The addressing scheme is illustrated in FIG. 8. An example of such communication may be control communication between a TR-303 termination unit in the main shelf 102 and a unit in a subtended shelf 602, 604. The unit is the subtended shelf still uses its local ARCNET bus and the IRI unit provide the bridge between the local (intrashelf) and Intershelf ARCNET buses. Allowing direct addressing of units in the main shelf eliminates the complexity and further latency of a second bridging function in the main shelf 102.

Linear Add Drop Multiplex (ADM)

Figure 9A:
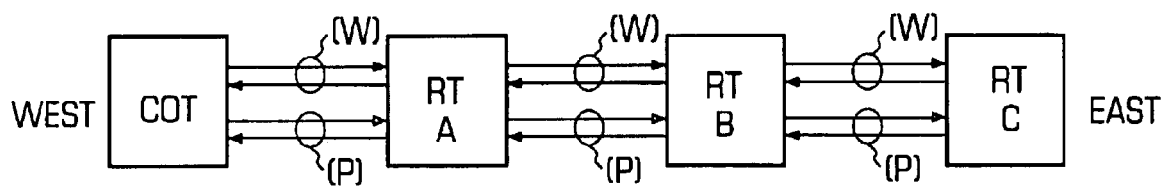
FIGS. 9a and 9b show schematics illustrating linear ADM network topology for use with the flexible SONET access and transmission system of FIG. 1 upgraded to linear ADM.
Figure 9B:
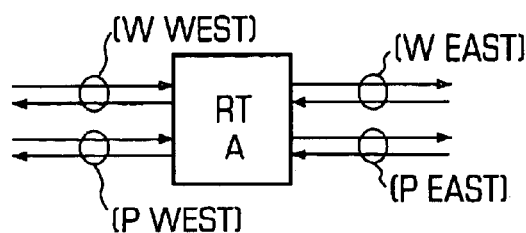

The backplane architecture of the preferred implementation of the system of the present invention allows for the possibility of upgrading to linear ADM as illustrated in FIGS. 9a and 9b. Linear ADM configurations require two sets of primary working and protection optical interfaces, one facing "east" and the other facing "west." It must be possible to place data onto the backplane receive PCM buses from either the east or west directions. Similarly, it must be possible to add transmit data from the backplane PCM buses to either the east or west directions. Of course, it must be possible to pass data through the system from east to west and west to east. It is assumed that both the east and west spans are protected by 1+1 protection.

For reference, it is always assumed here that the optical units facing west are those that occupy the HSU slots of the main shelf 102. The east-facing units are located in different locations, depending on whether the system uses OC-3 or OC-12/48.

Figure 10A:
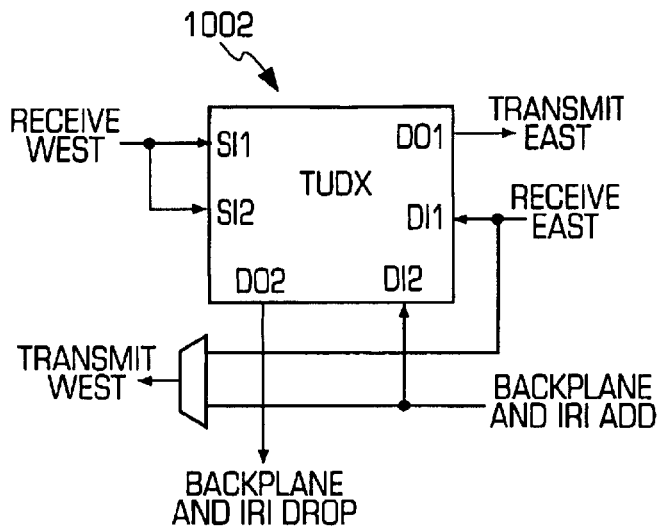
FIGS. 10a and 10b show schematics illustrating a preferred OC-3 TSI implementation having a TUDX chip.
Figure 10B:
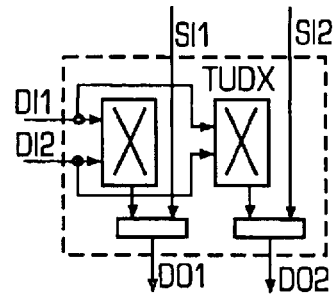

In an OC-3 system, the east-facing optical units occupy a pair of LSU slots in the LSU slot 1–6 region. The pass-through data from the west and the add data from the node are sent from the on-line HSU to the east OC-3 units over the PPRB bus at 38.88 MHZ. The HSUs are responsible for merging the pass-through and the data from that shelf to be transmitted on the east span. All of the received data from the on-line east OC-3 unit is sent to the HSUs over the PPXB bus. The HSUs are responsible for selecting the data from the east and west directions that must be placed onto the backplane as drop data. Since the same time slot from both the east and west directions may need to be dropped, the HSU must have adequate TSI capability to move the two data streams into non-conflicting time slots. This level of TSI requires a different OHSU than the one used for terminal and UPSR applications. FIGS. 10a and 10b illustrate one potential,HSU TSI implementation using the commercial available PMC-Sierra TUDX chip 1002. The east OC-3 units here are preferably the same units used as OC-3 tributary units in an OC-12 system.

In a OC-12 or OC-48 system, there is not enough bandwidth available in the prime PCM buses to locate the east OC-12 or OC-48 units in LSU slots 1–6. Here, the east OC-12 or OC-48 units will be located in a second shelf 602. The west OC-12/48 units send all their data to the east OC-12/48 units on the intershelf ring drop connections and the east OC-12/48 units send their data to the west OC-12/48 units through the intershelf ring add connections. (See FIG. 6 for normal intershelf ring connectivity with UPSR.) Internally, the OC-12 and OC-48 units have the capability to accept data from their partner unit for UPSR pass-through. In the linear ADM configuration, they perform a similar function, except that the data is coming from the IRI interface to the other shelf rather than from the partner unit.

Intra-shelf Control and Communications Intra-shelf Control and Communications

Two types of intra-shelf communications are general control of the shelf and SONET Section Data Communications Channel (SDCC). Additional signal lines are preferably included in the backplane to support additional communications buses if required by future applications.

All SDCC traffic is transferred between the OHSUs and the SCU with the Localtalk Bus (LTBUS). This type of communication is implemented with the Localtalk/Appletalk bus protocol and the bus connects to all units (except the PSUs) on the shelf backplane. The OHSU performs the function of frame delimiting, bit-destuffing, and CRC checking for received SDCC frames. If the LAPD frame is valid, the frame is encapsulated within an Appletalk frame and sent to the SCU over the HSB. The SCU performs the remaining Layer 2 processing for the LAPD frame as well as all high layer processing. Similarly, SDCC messages sent from the node originate on the SCU and are passed to the OHSU encapsulated in Appletalk frames on the HSB. The OHSU performs the outgoing frame delimiting, bit-stuffing, and CRC calculation. This LTBUS is used in the same manner by SONET tributary units (e.g., OVTG or OC-1). Since the SDCC is not used with SONET electrical interfaces, the MHSU and STS-1 tributary units do not pass SDCC data.

ARCNET (ANSI 878.1 token bus protocol) is preferably used for intra-shelf general communications because it meets the general requirements for a low-cost communications interface for cost-sensitive LSUs, and for autonomous reporting of alarms and protection switch requests by any unit. The detailed structure of the data within the intra-shelf messages is defined in the system's SAD.

Figure 11A:
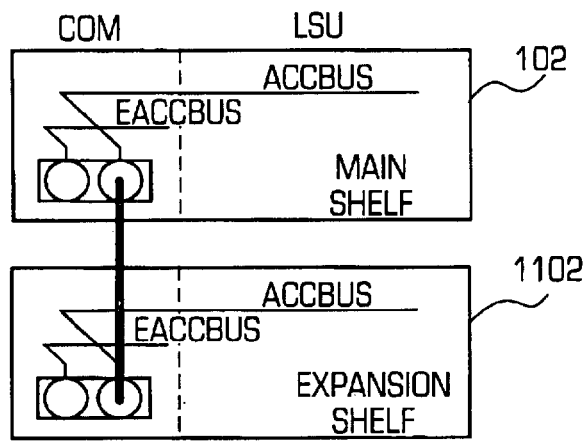
FIG. 11a shows a schematic illustrating an ARCNET connection between the main and expansion shelves for use with the flexible SONET access and transmission system of the present invention.
Figure 11B:
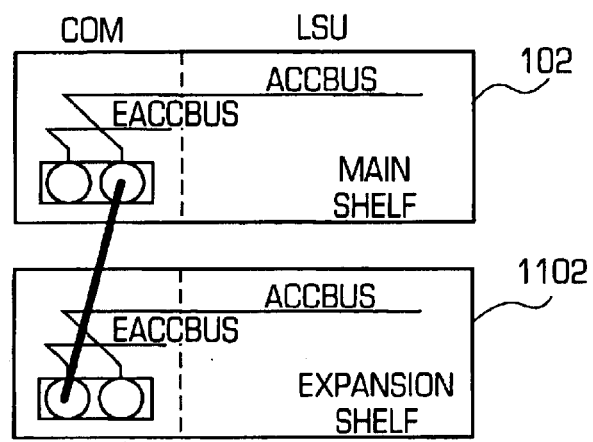
FIG. 11b shows a schematic illustrating an alternative ARCNET connection between the main and expansion shelves for use with the flexible SONET access and transmission system of the present invention.
Figure 12:
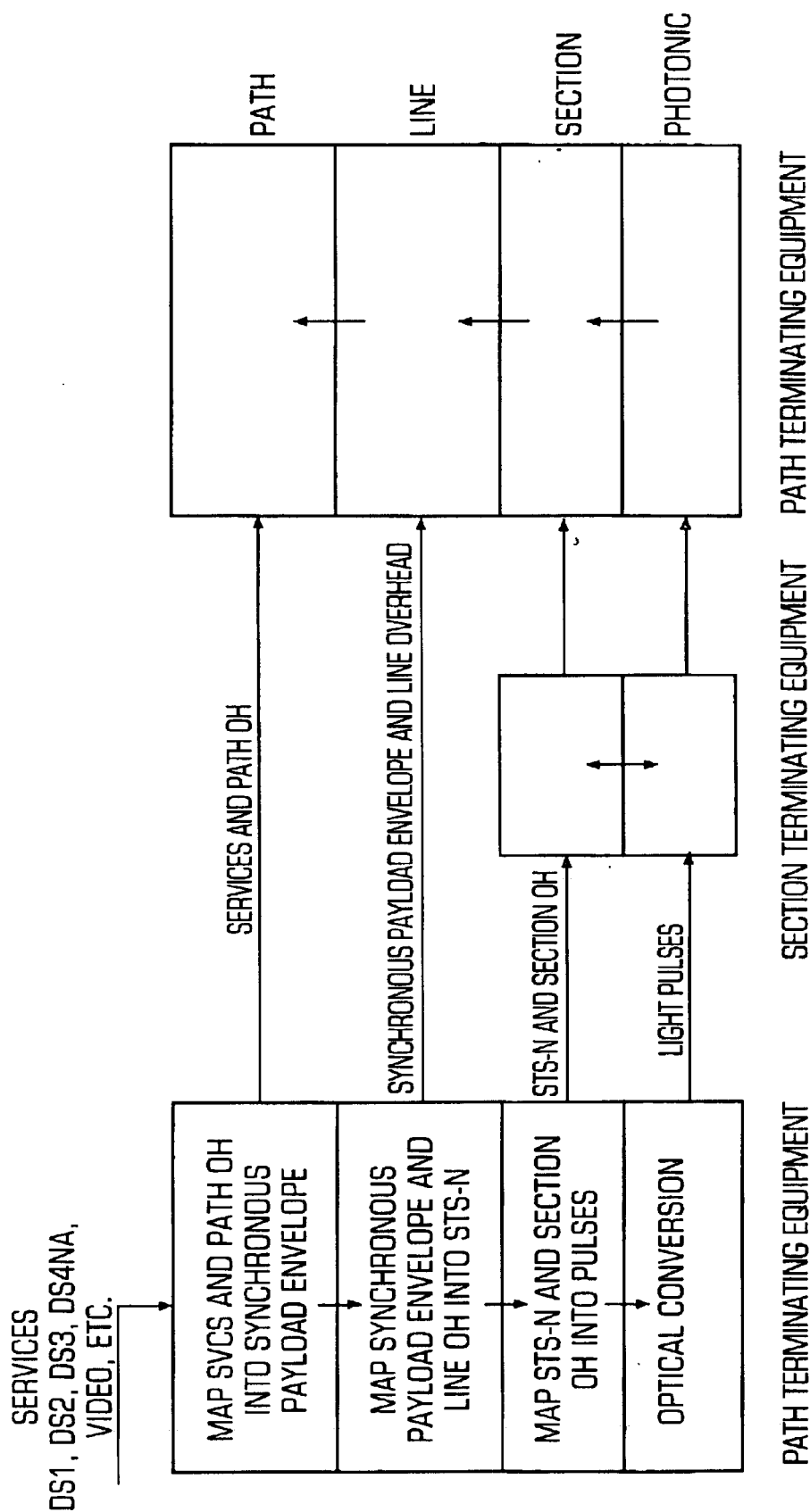
FIG. 12 shows a schematic model illustrating the SONET standard having the layered architecture implemented in two communicating computational units.

To communicate with an expansion shelf 1102, there are two options. A physical bridging of the buses is illustrated in FIG. 11a. If physically connecting the main 102 and expansion shelf 1102 ARCNET buses cannot be implemented in a robust manner, then the Expansion Shelf Interface (ESI) unit can provide a bus repeater function to connect the main and expansion shelf buses. In order to implement this repeater option, an additional, short ARCNET bus segment exists (the EACCBUS). This short segment is connected to the SCU and HSU slots and the expansion interface connector. The EACCBUS in the expansion shelf 1102 is connected to the primary ARCNET bus in the main shelf 102 through the expansion interface cable. FIG. 11b illustrates the EACCBUS and the required connection for repeated operation. The ESI unit provides the bus repeater function between the EACCBUS and the primary ARCNET buses in the expansion shelf 1102. A third option if the repeater function cannot be reliably implemented is to have the ESI unit perform a store and forward LAN bridge function between the two shelves 102, 1102. In this configuration, the SCU uses the EACCBUS for all communications with the expansion shelf 1102. The ESI unit performs the bridge function between the EACCBUS and main ARCNET buses in the expansion shelf 1102. However, the third option is not the preferred option since it would require the ESI unit to perform all the unit insertion and removal detection for the expansion shelf 1102.

An additional pair of signals traverses the backplane and is available to the HSU (P and W), SCU, and all LSUs (1–24). This pair of wires is reserved for auxiliary bus(es). An example application for this bus may be placing an Internet Protocol (IP) processing unit into a tributary unit slot and using the bus as a 10Base2 Ethernet data link between processing and storage units.

In-service HSU Upgrade to Higher Bandwidth (OC-3 to OC-12/48, and OC-12 to OC-48)

The in-service upgrade of an OHSU in a linear terminal topology is a straightforward matter. The protection (off-line) OC-3 unit is replaced by a new OC-12 unit. The OC-12 unit is then provisioned to have the appropriate add/drop map (i.e., to perform add drops from the same time slots that the tributary units are currently using with the OC-3 unit). The on-line status is then manually transferred to the OC-12 unit so that the other OC-3 unit can be replaced. The only data loss occurs during the on-line status switch from the OC-3 to the OC-12 unit. This same procedure is used for upgrading either an OC-3 system or OC-12 system to OC-48.

In ring topologies, the in-service upgrade involves the additional issue of the pass-through data. In order to allow the upgrade of a ring, it is possible to carry the OC-3 ring's pass-through data over the upgraded OC-12 spans. As a result, the OC-3 and OC-12 (and OC-48) units must be capable of exchanging PCM data with each other over the pass-through interface. This pass-through compatibility is accomplished in the interface of the present invention by using the same signal format for OC-3 through OC-48 with respect to rate and bit assignments. The capacity of each of the six pass-through interface signals is eight STS-1s. For OC-3, a single signal is used and filled with only three STS-1s. For OC-12, two signals are used and filled with twelve STS-1s. OC-48 uses all six signals. Since all unit types use the same signal rates and formats, pass-through may be provisioned on a per-VT /per-STS-1 basis for each unit in the same manner as if that unit were paired with an identical unit. For example, an OC-12 unit would only be provisioned to pass-through those VTs that need to be passed through from the OC-3 ring, and these VTs would occupy the same STS-1 and VT numbers within both STS-N signals. Similarly, an OC-3 unit will only pass-through those VTs that is provisioned to pass, and ignore STS-1s 4–12 on the pass-through interface.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

We claim:

1. A SONET network interface for interconnecting at least one high speed unit (HSU) with at least two low speed interface units (LSUs) to enable transmission of signals therebetween, the interface comprising:

a common bus of predetermined bit width for interfacing the at least one HSU unit with each of the at least two LSU units to enable transmission of signals from each of the at least two LSUs to the at least one HSU, and reception of the signals from the at least one HSU to each of the at least two LSUs:

a first partition bus of the predetermined bit width for interfacing the at least one HSU to a predetermined number of the at least two LSUs, the first partition bus being partitioned into a first bus for interfacing the at least one HSU to a first subset of the at least two LSUs and a second bus for interfacing the at least one HSU to a second subset of the at least two LSUs; and a second partition bus of the predetermined bit width for interfacing the at least one HSU to a predetermined number of the at least two LSU units, the second partition bus being partitioned into a third bus for interfacing the at least one HSU unit to the first subset of the at least two LSUs and a fourth bus for interfacing the at least one HSU unit with the second subset of the at least two LSUs; and an expansion shelf containing at least one expansion LSU and an expansion interface unit (ESI) connected to the at least one HSU of a shelf unit for exchange data between the shelf unit and the expansion shelf;

wherein the first, second, third, and fourth buses of respective first and second partition buses have a bit width less than the predetermined bit width to enable increased flexibility of signal transmissions to and from a SONET network;

wherein the at least one HSU, at least two LSUs, and common, first and second partition buses, are contained in the shelf unit;

wherein the shelf unit further comprises a system control processor unit (SCU) for controlling the processes of the units contained in the shelf, at least one system timing and control synchronization unit (STU) for controlling the timing and synchronization between the units contained in the shelf unit, and at least one power supply unit for powering the units contained in the shelf unit;

wherein the data transmitted from the expansion shelf has the same frame alignment as the data transmitted from the shelf unit relative to the at least one HSU for eliminating the need for frame alignment buffering on the at least one HSU.

2. The SONET network interface of claim 1, wherein the bandwidth and format of the common, first partition, and second partition buses is STS-1.

3. The SONET network interface of claim 1, wherein each of the common, first partition, and second partition buses contains four parallel data lines.

4. The SONET network interface of claim 3, wherein each of the common, first partition, and second partition buses further contains a byte status line for indicating the contents of the four parallel data lines.

5. The SONET network interface of claim 3, wherein data is placed onto the four parallel data lines of each of the common, first partition, and second partition buses in a high/low byte format.

6. The SONET network interface of claim 3, wherein data is placed onto the four parallel data lines of each of the common, first partition, and second partition buses in an odd/even byte format.

7. The SONET network interface of claim 1, wherein each of the LSUs are selected from a group consisting of voice frequency channel units (CHUs), wideband units, broadband units, and common processing units.

8. The SONET network interface of claim 7, further comprising a backplane connector for connecting the LSUs to their required signals, the backplane connector having a first subset of connections for connecting one of the CHUs, wideband units, broadband units, or common processing units to their required signals.

9. The SONET network interface of claim 8, wherein the first subset of connections of the backplane connector connects the CHUs to their required signals.

10. The SONET network interface of claim 1, wherein the interface comprises first and second HSUs, each HSU being interconnected to the at least two LSUs via the common, first partition, and second partition buses.

11. The SONET network interface of claim 1, further comprising a backplane local area network for allowing exchange of packet data within the signals with data processing LSUs.

12. The SONET network interface of claim 11, wherein the backplane local area network provides Internet services.

13. The SONET network interface of claim 1, wherein the bandwidth and format of the common, first partition, and second partition buses is STS-1 and wherein the first subset of LSU's has a capacity of OC-3.

14. The SONET network interface of claim 1, wherein the bandwidth and format of the common, first partition, and second partition buses is STS-1 and wherein line, section, STS path, and VT path termination functions are performed on the at least one HSU.

15. The SONET network interface of claim 1, wherein the bandwidth and format of the common, first partition, and second partition buses is STS-1 and at least one of the at least two LSUs are voice frequency channel units (CHUs), whereby the at least one HSU serves as a common location where DS1 and VT1.5 overhead information is added to the transmitted signal.

16. The SONET network interface of claim 15, wherein the DS1 is also terminated in the at least one HSU.

17. The SONET network interface of claim 1, wherein at least one of the LSUs generate virtual tributaries for generating all of the transmit overhead for those virtual tributaries and wherein the at least one LSU that generate STS-1s generate all of the transmit overhead for those STS-1s.

18. The SONET network interface of claim 1, wherein the expansion shelf further has at least one power supply unit for powering the units contained on the expansion shelf.

19. The SONET network interface of claim 1, wherein the frame alignment between the main shelf and the expansion shelf allows hairpinned exchanged of PCM data between LSUs in the main and expansion shelves.

20. A SONET network interface for interconnecting at least one high speed unit (HSU) with at least two low speed interface units (LSUs) to enable transmission of signals therebetween, the interface comprising:

a common bus of predetermined bit width for interfacing the at least one HSU unit with each of the at least two LSU units to enable transmission of signals from each of the at least two LSUs to the at least one HSU, and reception of the signals from the at least one HSU to each of the at least two LSUs:

a first partition bus of the predetermined bit width for interfacing the at least one HSU to a predetermined number of the at least two LSUs, the first partition bus being partitioned into a first bus for interfacing the at least one HSU to a first subset of the at least two LSUs and a second bus for interfacing the at least one HSU to a second subset of the at least two LSUs; and a second partition bus of the predetermined bit width for interfacing the at least one HSU to a predetermined number of the at least two LSU units, the second partition bus being partitioned into a third bus for interlacing the at least one HSU unit to the first subset of the at least two LSUs and a fourth bus for interfacing the at least one HSU unit with the second subset of the at least two LSUs; and an expansion shelf containing at least one expansion LSU and an expansion interface unit (ESI) connected to the at least one HSU of a shelf unit for exchanging data between the shelf unit and the expansion shelf;

wherein the first, second, third, and fourth buses of respective first and second partition buses have a bit width less tar the predetermined bit width to enable increased flexibility of signal transmissions to and from a SONET network;

wherein the at least one HSU, at least two LSUs, and common, first and second partition buses, are contained in the shelf unit;

wherein the shelf unit further comprises a system control processor unit (SCU) for controlling the processes of the units contained in the shelf at least one system timing and control synchronization unit (STU) for controlling the timing and synchronization between the units contained in the shelf unit, and at least one power supply unit for powering the units contained in the shelf unit;

wherein a local area network exists between the shelf unit and the expansion shelf such that LSUs in the expansion shelf can communicate control, alarm or signaling information directly with common-processing HSUs or LSUs in the shelf unit.

21. The SONET network interface of claim 20, wherein the interface comprises twenty four LSUs, six of which comprise the first subset and the remaining comprising the second subset.

22. The SONET network interface of claim 20, wherein the interface comprises:

two HSUs, each HSU being interconnected to the at least two LSUs via the common, first partition, and second partition buses; and twenty four LSUs, six of which comprise the first subset and the remaining comprising the second subset.

23. The SONET network interface of claim 20, wherein the first and second, or third and fourth buses operate at different bus rates.

24. The SONET network interface of claim 23, wherein the bandwidth and format of the first partition and second partition buses is STS-3.

25. The SONET network interface of claim 20, wherein the first and second or third and fourth buses operate at the same bus rates.

26. The SONET network interface of claim 20, wherein a receive direction of at least one of the common, first, second, third, and fourth buses operates at a higher rate than that used by a transmit direction of these buses.

27. A SONET network interface of for interconnecting at least one high speed unit (HSU) with at least two low speed interface units (LSUs) to enable transmission of signals therebetween, the interface comprising:

a common bus of predetermined bit width for interfacing the at least one HSU unit with each of the at least two LSU units to enable transmission of signals from each of the at least two LSUs to the at least one HSU, and reception of the signals from the at least one HSU to each of the at least two LSUs;

a first partition bus of the predetermined bit width for interfacing the at least one HSU to a predetermined number of the at least two LSUs, the first partition bus being partitioned into a first bus for interfacing the at least one HSU to a first subset of the at least two LSUs and a second bus for interfacing the at least one HSU to a second subset of the at least two LSUs; and a second partition bus of the predetermined bit width for interfacing the at least one HSU to a predetermined number of the at least two LSU units, the second partition bus being partitioned into a third bus for interfacing the at least one HSU unit to the first subset of the at least two LSUs and a fourth bus for interfacing the at least one HSU unit with the second subset of the at least two LSUs; and an expansion shelf containing at least one expansion LSU and an expansion interface unit (ESI) connected to the at least one HSU of a shelf unit for exchanging data between the shelf unit and the expansion shelf;

wherein the first, second, third, and fourth buses of respective first and second partition buses have a bit width less than the predetermined bit width to enable increased flexibility of signal transmissions to and from a SONET network;

wherein the at least one HSU, at least two LSUs, and common, first and second partition buses, are contained in the shelf unit;

wherein the shelf unit further comprises a system control processor unit (SCU) for controlling the processes of the units contained in the shelf, at least one system timing and control synchronization unit (STU) for controlling the timing and synchronization between the units contained in the shelf unit, and at least one power supply unit for powering the units contained in the shelf unit;

wherein some of the at least two LSU's which perform a common processing function on the first and third buses at a STS-3 rate process all of the data from all LSUs connected to the second and fourth buses and the at least one expansion LSU in the expansion shelf, and wherein in a receive direction, STS-3 data is sent over the first bus from the at least one HSU to the common processing LSU's, processed by the common processing LSU'S, and sent back over the first bus from the common processing LSU's to the at least one HSU, processed received data is subsequently sent from the at least one HSU over the common bus, second bus, fourth bus, and expansion shelf interface to the at least one LSUs, wherein the transmit data from the at least one LSUs that is sent to the at least one HSU over the common bus, second bus, fourth bus, or expansion interface unit is sent by the at least one HSU over the third bus at STS-3 rate to the at least one common processing LSU, the at least one common processing LSU processing the transmit data and sends it back to the at least one HSU for subsequent transmission.

28. A method for interconnecting at least one high speed unit (HSU) with at least two low speed interface units (LSUs) in a SONET network interface to enable transmission of signals between the HSU and LSUs, the method comprising:

interfacing the at least one HSU unit with each of the at least two LSU units by means of a common bus of predetermined bit width to enable transmission of signals from each of the at least two LSUs to the at least one HSU, and reception of the signals from the at least one HSU to each of the at least two LSUs;

interfacing the at least one HSU to a predetermined number of the at least two LSUs by means of a first partition bus of the predetermined bit width, the first partition bus being partitioned into a first bus for interfacing the at least one HSU to a first subset of the at least two LSUs and a second bus for interfacing the at least one HSU to a second subset of the at least two LSUs;

interfacing the at least one HSU to a predetermined number of the at least two LSU units using a second partition bus of the predetermined bit width, the second partition bus being partitioned into a third bus for interfacing the at least one HSU unit to the first subset of the at least two LSUs and a fourth bus for interfacing the at least one HSU unit with the second subset of the at least two LSUs;

containing the at least one HSU, at least two LSUs, and the common, first and second partition buses, in a shelf unit;

providing the shelf unit with a system control processor unit (SCU) for controlling the processes of the units contained in the shelf, at least one system timing and control synchronization unit (STU) for controlling the timing and synchronization between the units contained in the shelf unit, and at least one power supply unit for powering the units contained in the shelf unit;

providing an expansion shelf containing at least one expansion LSU and an expansion interface unit (ESI);

connecting the at least one HSU of the shelf unit for exchanging data between the shelf unit and the expansion shelf, and providing the expansion shelf with at least one power supply unit for powering the units contained on the expansion shelf; and aligning the data transmitted from the expansion shelf to the data transmitted from the shelf unit such that the data transmitted from the expansion shelf has the same frame alignment as the data transmitted from the shelf unit relative to the at least one HSU for eliminating the need for frame alignment buffering on the at least one HSU, whereby the first, second, third and fourth busses of respective first and second partition buses have a bit width less than the predetermined bit width to enable increased flexibility of signal transmissions to and from a SONET network.

29. The method of claim 28, further comprising the step of providing an STS-1 bandwidth and format for the common, first partition, and second partition buses.

30. The method of claim 28, further comprising the step of providing an STS-3 bandwidth and format for the first partition and second partition buses.

31. The method of claim 28, further comprising the step of partitioning each of the common, first partition, and second partition buses to contain four parallel data lines.

32. The method of claim 31, further comprising the step of placing data onto the four parallel data lines of each of the common, first partition, and second partition buses in a high/low byte format.

33. The method of claim 31, further comprising the step of placing data onto the four parallel data lines of each of the common, first partition, and second partition buses in an odd/even byte format.

34. The method of claim 28, wherein the interface comprises first and second HSUs, and further comprising the step of interconnecting each HSU to the at least two LSUs via the common, first partition, and second partition buses.

35. The method of claim 28, further comprising the step of providing a backplane local area network for allowing exchange of packet data within the signals with data processing LSUs.

36. The method of claim 35, wherein the backplane local area network provides Internet services.

37. The method of claim 28, wherein the bandwidth and format of the common, first partition, and second partition buses is STS-1 and further comprising the step of performing line, section, STS path, and VT path the termination functions on the at least one HSU.

38. The method of claim 28, wherein the bandwidth and format of the common, first partition, and second partition buses is STS-1 and at least one of the at least two LSUs are voice frequency channel units (CHUs), further comprising the step of adding DS1 and VT1.5 overhead information to the transmitted signal such that the at least one HSU serves as a common location.

39. The method of claim 28, wherein at least one of the LSUs generate virtual tributaries for generating all of the transit overhead for those virtual tributaries and wherein the at least one LSU that generate STS-1s generate all of the transmit overhead for those STS-1s.

40. The method of claim 28, wherein the frame alignment between the main shelf and the expansion shelf allows hairpinned exchanged of PCM data between LSUs in the and expansion shelves.

41. A method for interconnecting at least one high speed unit (HSU) with at least two low speed interface units (LSUs) in a SONET network interface to enable transmission of signals between the HSU and LSUs, the method comprising:

interfacing the at least one HSU unit with each of the at least two LSU units by means of a common bus of predetermined bit width to enable transmission of signals from each of the at least two LSUs to the at least one HSU, and reception of the signals from the at least one HSU to each of the at least two LSUs;

interfacing the at least one HSU to a predetermined number of the at least two LSUs by means of a first partition bus of the predetermined bit width, the first partition bus being partitioned into a first bus for interfacing the at least one HSU to a first subset of the at least two LSUs and a second bus for interfacing the at least one HSU to a second subset of the at least two LSUs;

interfacing the at least one HSU to a predetermined number of the at least two LSU units using a second partition bus of the predetermined bit width, the second partition bus being partitioned into a third bus for interfacing the at least one HSU unit to the first subset of the at least two LSUs and a fourth bus for interfacing the at least one HSU unit with the second subset of the at least two LSUs;

containing the at least one HSU, at least two LSUs, and the common, first and second partition buses, in a shelf unit;

providing the shelf unit with a system control processor unit (SCU) for controlling the processes of the units contained in the shelf, at least one system timing and control synchronization unit (STU) for controlling the timing and synchronization between the units contained in the shelf unit, and at least one power supply unit for powering the units contained in the shelf unit;

providing an expansion shelf containing at least one expansion LSU and an expansion interface unit (ESI);

connecting the at leas one HSU of the shelf unit for exchanging data between the shelf unit and the expansion shelf; and a local area network between the shelf unit and the expansion shelf such that LSUs in the expansion shelf can communicate control, alarm, or signaling information directly with common-processing HSUs or LSUs in the shelf unit, whereby the first, second, third, and fourth buses of respective first and second partition buses have a bit width less than the predetermined bit width to enable increased flexibility of signal transmissions to and from a SONET network.

42. The method of claim 41, further comprising the step of operating the first and second or third and fourth buses at different bus rates.

43. The method of claim further comprising the step of terminating the DS1 in the at least one HSU.

44. The method of claim 41, wherein the bandwidth and format of the first partition and second partition buses is STS-3.

45. The method of claim 44, further comprising the step of operating the first and second or third and fourth buses at the same bus rates.

46. A method for interconnecting at least one high speed unit (HSU) with at least two low speed interface units (LSUs) in a SONET network interface to enable transmission of signals between the HSU and LSUs, the method comprising:

interfacing the at least one HSU unit with each of the at least two LSU units by means of a common bus of predetermined bit width to enable transmission of signals from each of the at least two LSUs to the at least one HSU, and reception of the signals from the at least one HSU to each of the at least two LSUs;

interfacing the at least one HSU to a predetermined number of the at least two LSUs by means of a first partition bus of the predetermined bit width, the first partition bus being partitioned into a first bus for interfacing the at least one HSU to a first subset of the at least two LSUs and a second bus for interfacing the at least one HSU to a second subset of the at least two LSUs;

interfacing the at least one HSU to a predetermined number of the at least two LSU units using a second partition bus of the predetermined bit width, the second partition bus being partitioned into a third bus for interfacing the at least one HSU unit to the first subset of the at least two LSUs and a fourth bus for interfacing the at least one HSU unit with the second subset of the at least two LSUs;

containing the at least one HSU, at least two LSUs, and the common, first and second partition buses, in a shelf unit;

providing the shelf unit with a system control processor unit (SCU) for controlling the processes of the units contained in the shelf, at least one system timing and control synchronization unit (STU) for controlling the timing and synchronization between the units contained in the shelf unit, and at least one power supply unit for powering the units contained in the shelf unit;

providing an expansion shelf containing at least one expansion LSU and an expansion interface unit (ESI);

connecting the at least one HSU of the shelf unit for exchanging data between the shelf unit and the expansion shelf; and providing the expansion shelf with at least one power supply unit for powering the units contained on the expansion shelf; and whereby the first second, third, and fourth busses of respective first and second partition buses have a bit width less than the predetermined bit width to enable increased flexibility of signal transmissions to and from a SONET network;

wherein some of the at least two LSUs which perform a common processing function on the first and third buses at a STS-3 rate process all of the data from all LSUs connected to the second and fourth buses and the at least one expansion LSU in the expansion shelf, and wherein in a receive direction STS-3 data is sent over the first bus from the at least one HSU to the common processing LSU's, processed by the common processing LSU's, and sent back over the first bus from the common processing LSU's to the at least one HSU, processed received data is subsequently sent from the at least one HSU over the common bus, second bus, fourth bus, and expansion shelf interface to the at least one LSUs, wherein the transmit data from the at least one LSUs that is sent to the at least one HSU over the common bus, second bus, fourth bus, or expansion interface unit is sent by the at least one HSU over the third bus at STS-3 rate to the at least one common processing LSU, the at least one common processing LSU processing the transmit data and sends it back to the at least one HSU for subsequent transmission.

* * * * *